(12) United States Patent
Neeper et al.

(10) Patent No.: US 9,895,695 B2
(45) Date of Patent: Feb. 20, 2018

(54) DEVICE AND METHOD FOR REMOVING A PEELABLE SEAL

(71) Applicant: Brooks Automation, Inc., Chelmsford, MA (US)

(72) Inventors: Robert K. Neeper, Ramona, CA (US); Rhett L. Affleck, Poway, CA (US); Roger Howard, San Diego, CA (US)

(73) Assignee: Brooks Automation, Inc., Chelmsford, MA (US)

( * ) Notice: Subject to any disclaimer, the term of this patent is extended or adjusted under 35 U.S.C. 154(b) by 0 days.

(21) Appl. No.: 14/316,414

(22) Filed: Jun. 26, 2014

(65) Prior Publication Data

US 2014/0367051 A1 Dec. 18, 2014

Related U.S. Application Data

(60) Continuation of application No. 13/284,437, filed on Oct. 28, 2011, now Pat. No. 8,764,934, which is a (Continued)

(51) Int. Cl.
*B32B 38/10* (2006.01)
*B01L 9/00* (2006.01)
(Continued)

(52) U.S. Cl.
CPC .............. *B01L 9/00* (2013.01); *B01L 99/00* (2013.01); *B29C 63/0013* (2013.01); *B67B 7/00* (2013.01);
(Continued)

(58) Field of Classification Search
CPC . B32B 38/10; B32B 43/006; Y10T 156/1174; Y10T 156/195; Y10T 156/1978; Y10T 156/1989
(Continued)

(56) References Cited

U.S. PATENT DOCUMENTS

| 4,009,845 A | 3/1977 | Santucci et al. |
| 4,557,783 A | 12/1985 | Grone et al. |

(Continued)

FOREIGN PATENT DOCUMENTS

| CN | 1841657 | 10/2006 |
| DE | 20109063 | 8/2001 |

(Continued)

OTHER PUBLICATIONS

Hj-Bioanalytik GMBH "RoboPeel: Desealing Robotic System for Microtitreplates", http://www.hj-bioanalytik.de/english/robopeel.htm, printed May 15, 2007.

*Primary Examiner* — Mark A Osele
*Assistant Examiner* — Nickolas Harm
(74) *Attorney, Agent, or Firm* — Perman & Green, LLP; Colin C. Durham

(57) ABSTRACT

A container or array of containers that is are sealed with a peelable seal is transported via a conveyor along a processing path toward a desealing station at which an adhesive surface having a width substantially the same as or greater than the width of the seal is pressed against the upper surface of the peelable seal. A collection rod applies a downward pressure on the adhesive surface, pressing it against the seal and keeping the container or container array in position on the conveyor as the plate moves with the conveyor. As the leading edge of the seal passes the collection rod, the adhesive surface is rolled upward, away from the plane of the seal, pulling up on the leading edge of the seal to separate it from the container or container array while the container or container array is held down by the roller. The removed seal is then discarded.

20 Claims, 22 Drawing Sheets

Related U.S. Application Data division of application No. 12/045,644, filed on Mar. 10, 2008, now Pat. No. 8,047,253.

(60) Provisional application No. 60/946,799, filed on Jun. 28, 2007, provisional application No. 60/915,890, filed on May 3, 2007, provisional application No. 60/894,188, filed on Mar. 9, 2007.

(51) Int. Cl.
*B29C 63/00* (2006.01)
*B67B 7/00* (2006.01)
*B01L 99/00* (2010.01)
*B32B 43/00* (2006.01)

(52) U.S. Cl.
CPC .............. *B32B 38/10* (2013.01); *B32B 43/006* (2013.01); *Y10T 156/1168* (2015.01); *Y10T 156/1174* (2015.01); *Y10T 156/19* (2015.01); *Y10T 156/195* (2015.01); *Y10T 156/1956* (2015.01); *Y10T 156/1978* (2015.01); *Y10T 156/1989* (2015.01)

(58) Field of Classification Search
USPC ........................................ 156/715, 759, 766
See application file for complete search history.

(56) References Cited

U.S. PATENT DOCUMENTS

| | | |
|---|---|---|
| 4,832,282 A | 5/1989 | Koike |
| 5,006,190 A | 4/1991 | Earle |
| 5,060,882 A | 10/1991 | Rousculp et al. |
| 5,191,693 A | 3/1993 | Umetsu |
| 5,282,918 A | 2/1994 | Heist et al. |
| 5,466,325 A | 11/1995 | Mizuno et al. |
| 5,466,352 A | 11/1995 | Brucken et al. |
| 5,540,809 A | 7/1996 | Ida et al. |
| 5,851,492 A | 12/1998 | Blattner |
| 6,099,230 A | 8/2000 | Hitch |
| 6,149,758 A | 11/2000 | Tsujimoto et al. |
| 6,408,595 B1 | 6/2002 | Friedman |
| 6,458,582 B1 | 10/2002 | Kimura et al. |
| 6,543,203 B2 | 4/2003 | Thompson et al. |
| 6,585,471 B2 | 7/2003 | Odajima et al. |
| 6,652,706 B1 | 11/2003 | MacNeil et al. |
| 6,786,266 B2 | 9/2004 | Fukada |
| 6,792,991 B2 | 9/2004 | Thallner |
| 6,868,890 B2 | 3/2005 | Hirsch |
| 6,896,848 B1 | 5/2005 | Warhurst et al. |
| 6,905,268 B1 | 6/2005 | Holland et al. |
| 6,939,516 B2 | 9/2005 | Hall et al. |
| 7,421,831 B2 | 9/2008 | Neeper et al. |
| 2001/0017189 A1 | 8/2001 | Tsujimoto et al. |
| 2001/0029064 A1 | 10/2001 | Odajima et al. |
| 2003/0037877 A1 | 2/2003 | Brinkmann |
| 2004/0018610 A1 | 1/2004 | Sandall |
| 2005/0184042 A1 | 8/2005 | Brown et al. |
| 2006/0079811 A1 | 4/2006 | Roe et al. |
| 2006/0219359 A1 | 10/2006 | Miyamoto et al. |
| 2007/0095024 A1 | 5/2007 | Neeper et al. |
| 2007/0235131 A1 | 10/2007 | Tsujimoto et al. |
| 2008/0026483 A1 | 1/2008 | Oldenburg |
| 2008/0044263 A1 | 2/2008 | Neeper et al. |
| 2008/0193338 A1 | 8/2008 | Nichols et al. |

FOREIGN PATENT DOCUMENTS

| | | |
|---|---|---|
| DE | 10107200 | 8/2002 |
| EP | 0559387 | 9/1993 |
| EP | 559387 | 7/1997 |
| EP | 1326720 | 7/2007 |
| FR | 1452206 | 2/1966 |
| JP | 63062328 | 3/1988 |
| JP | 11046091 | 2/1999 |
| JP | 09114384 | 7/2003 |
| JP | 2004157106 | 6/2004 |
| JP | 2005219892 | 8/2005 |
| JP | 2006232509 | 9/2006 |
| JP | 2006288308 | 10/2006 |
| WO | 0224353 | 3/2002 |
| WO | 0232667 | 4/2002 |

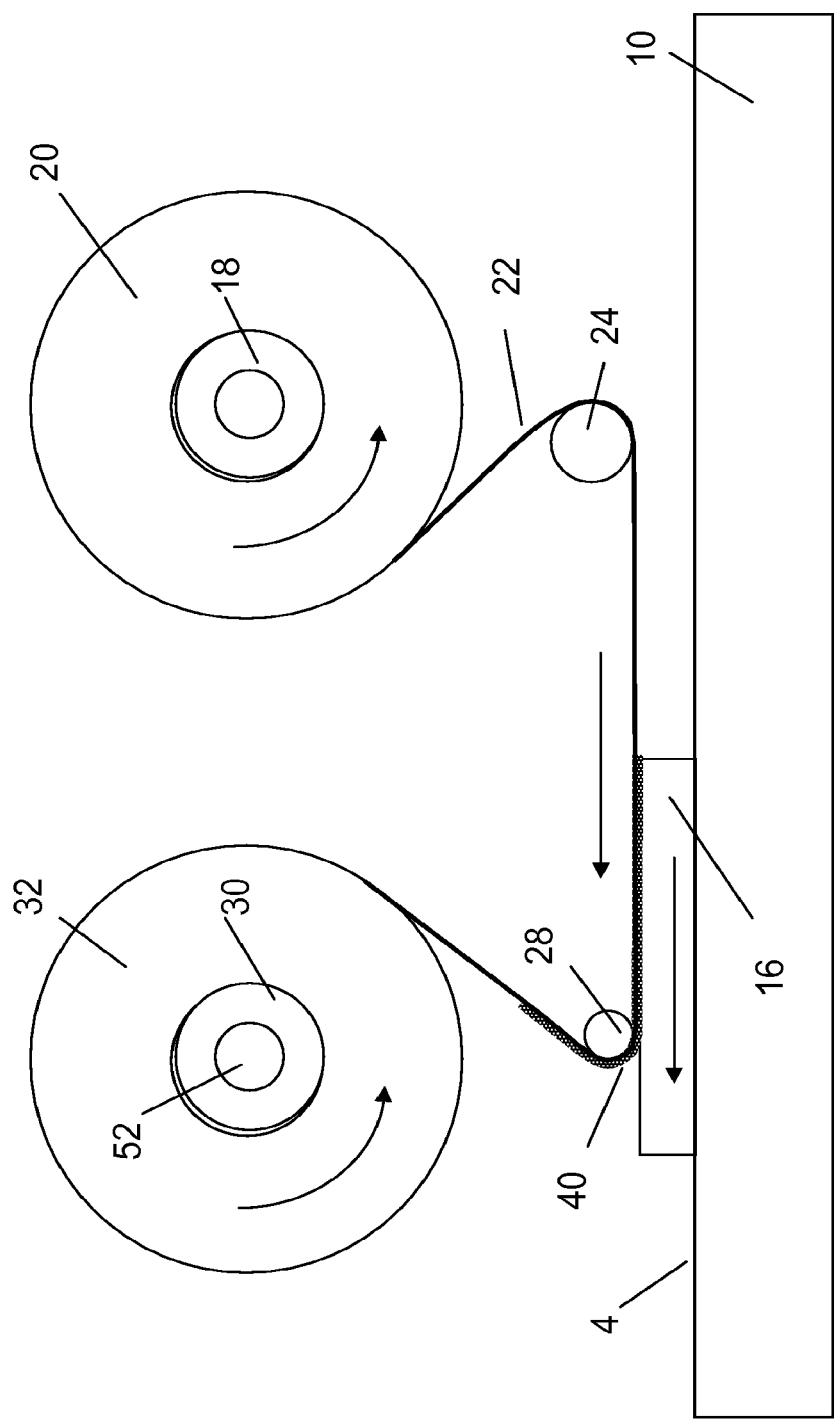

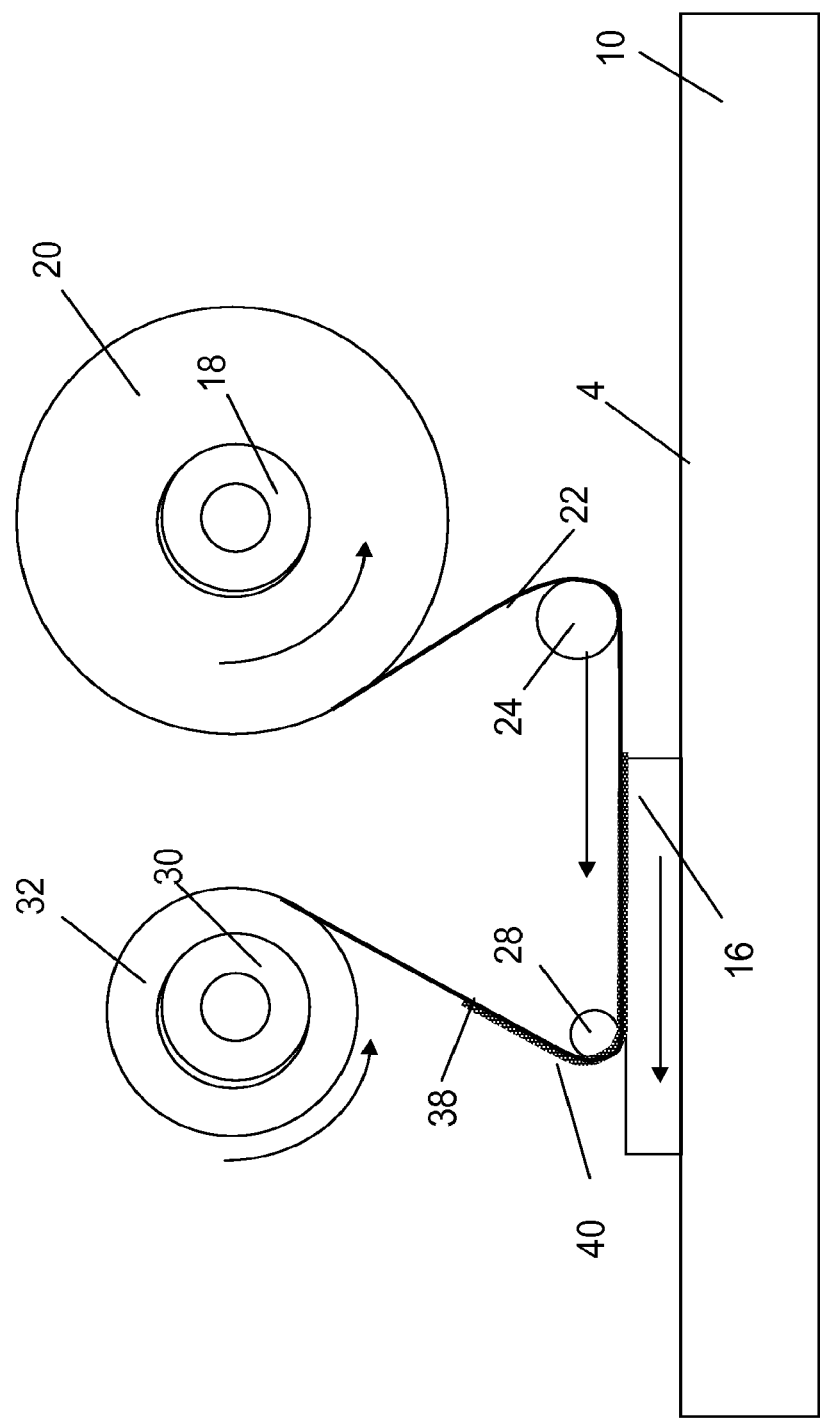

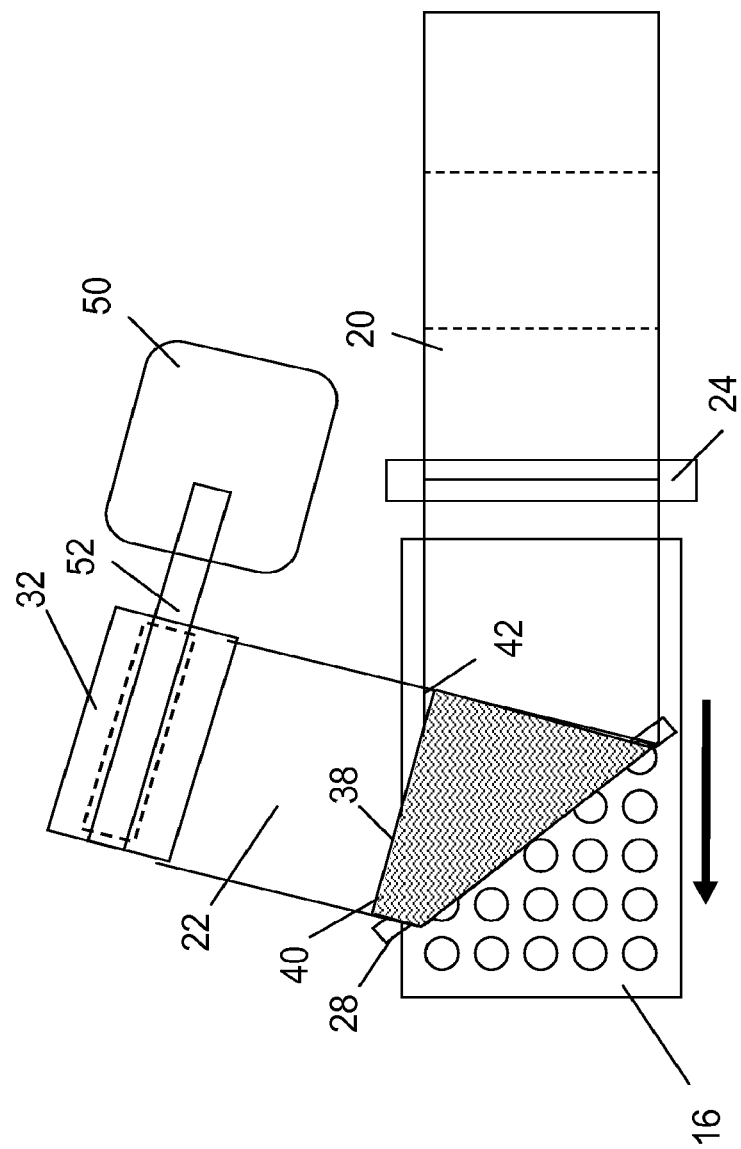

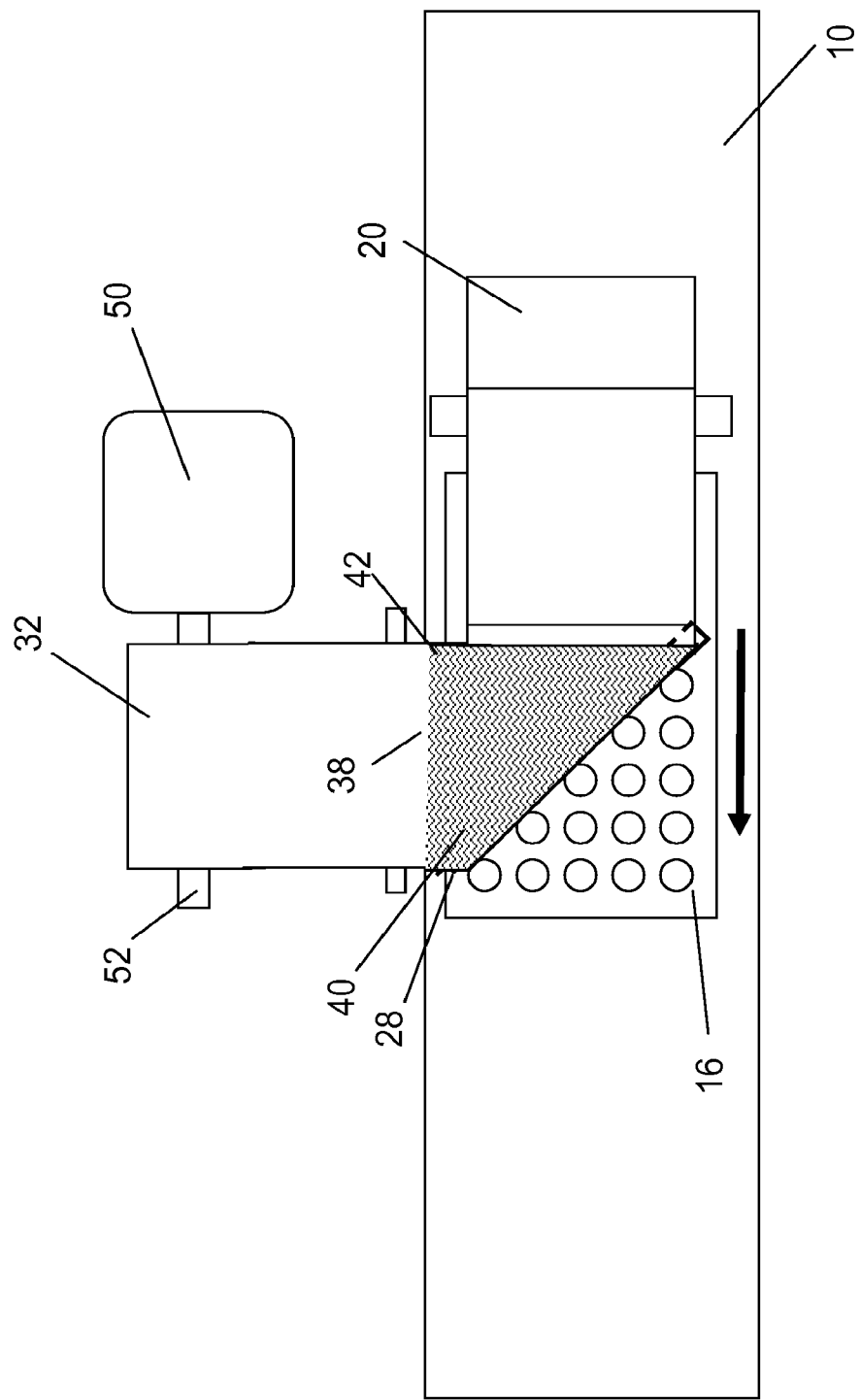

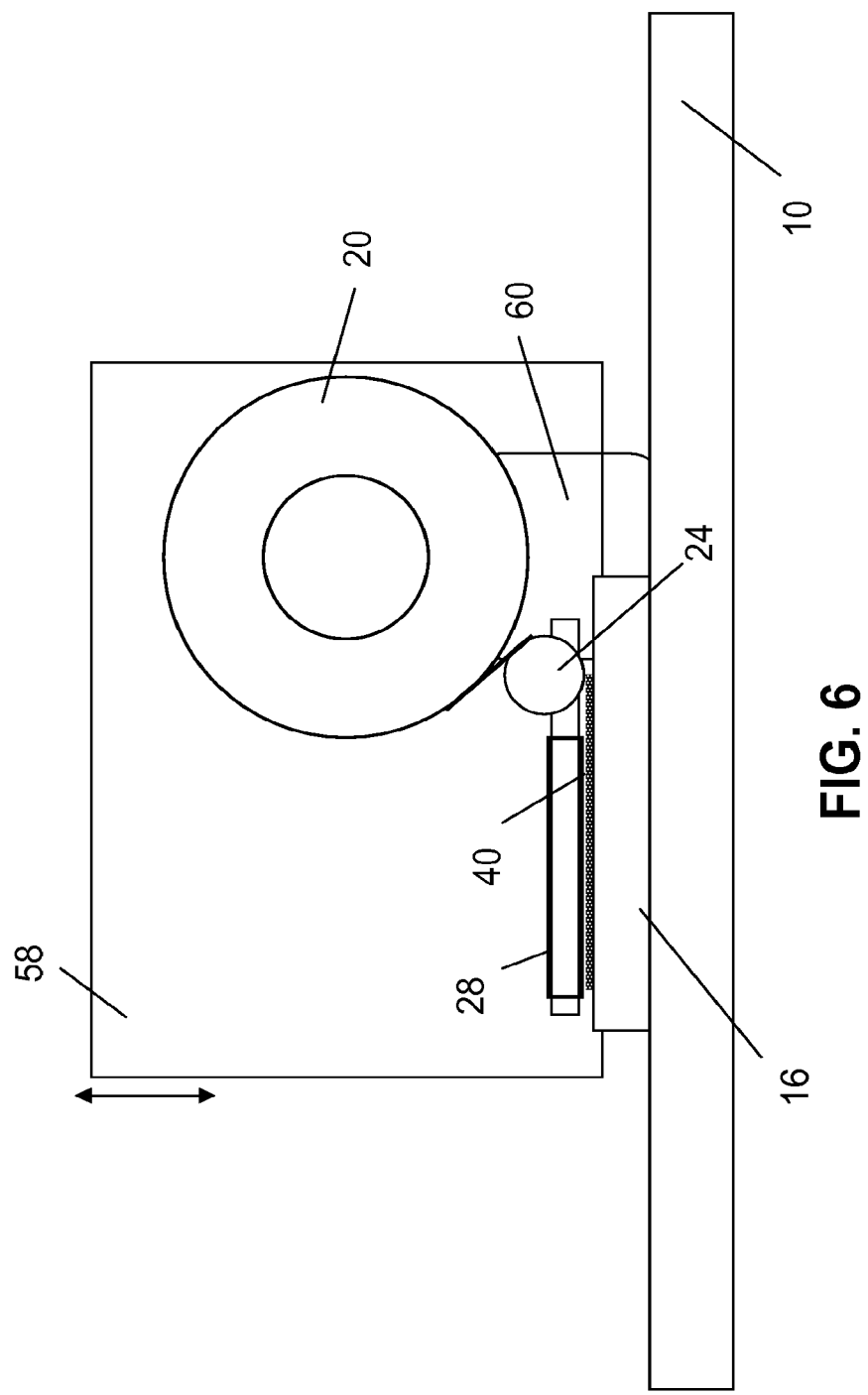

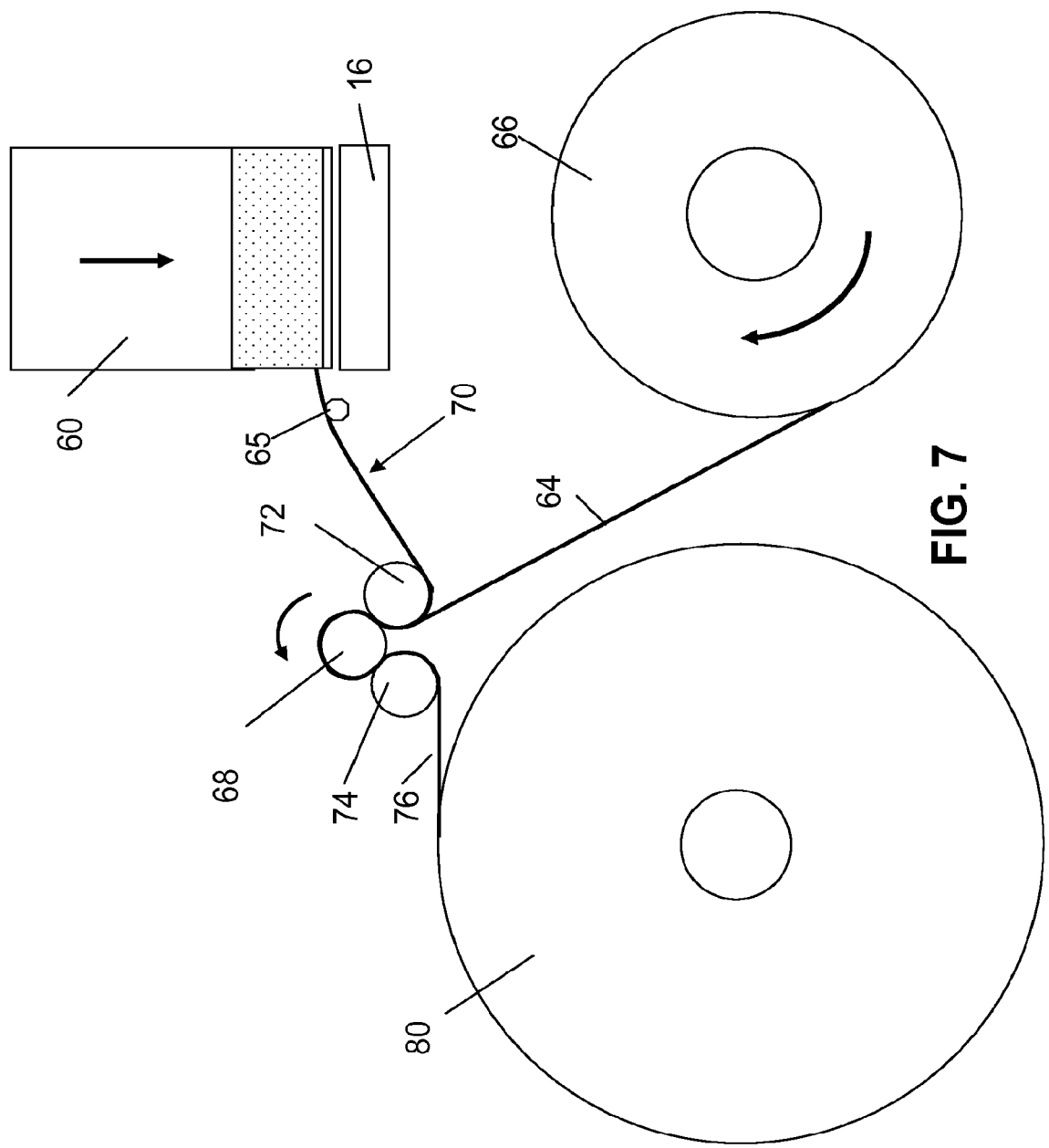

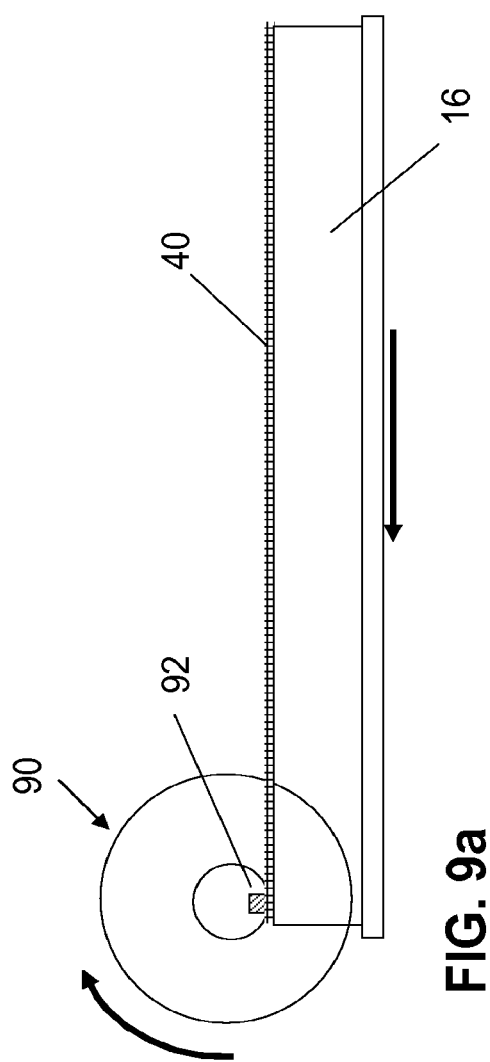
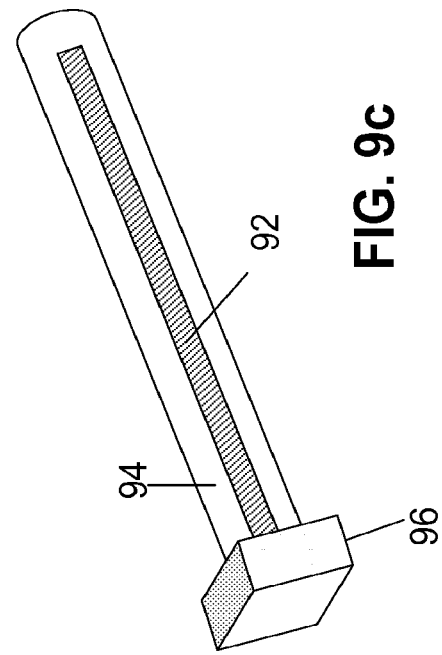
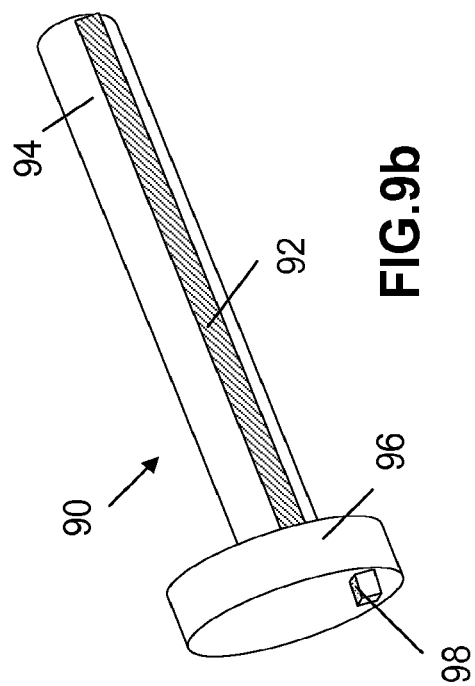

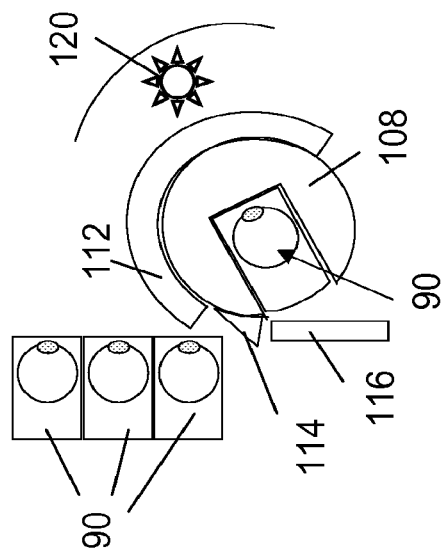
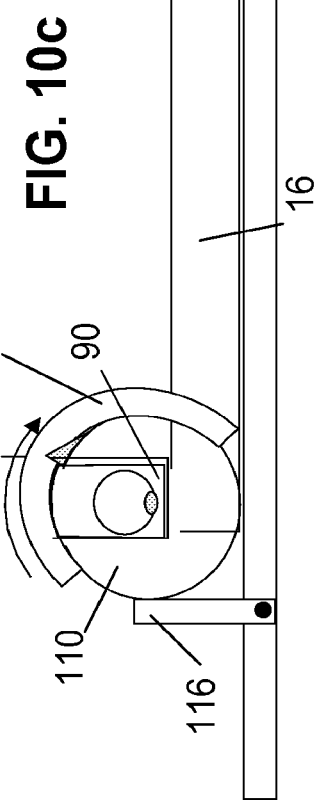
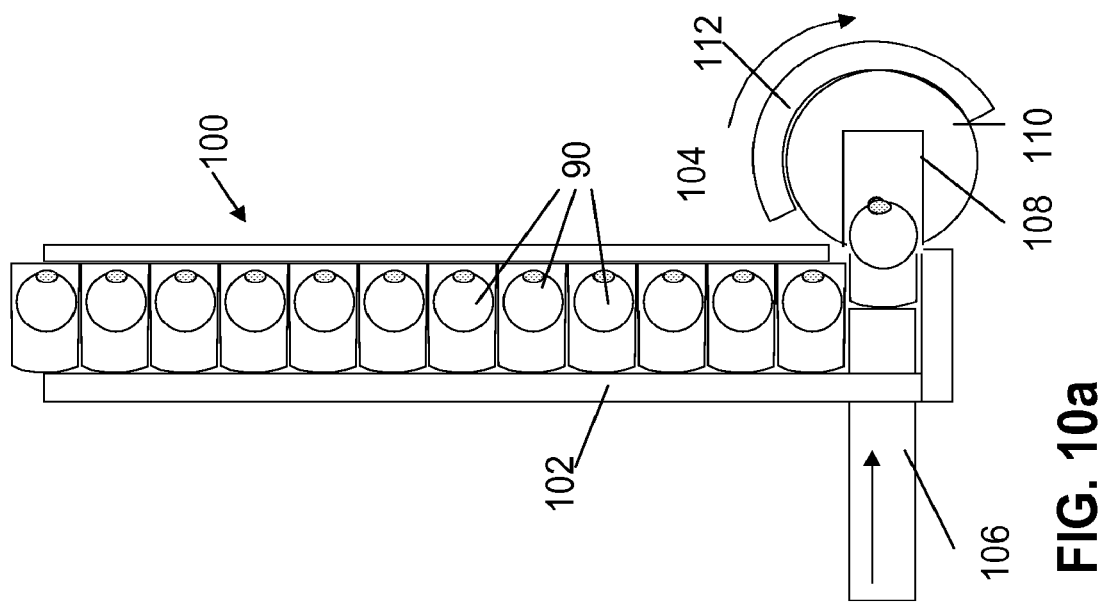
FIG. 10b
FIG. 10c
FIG. 10a

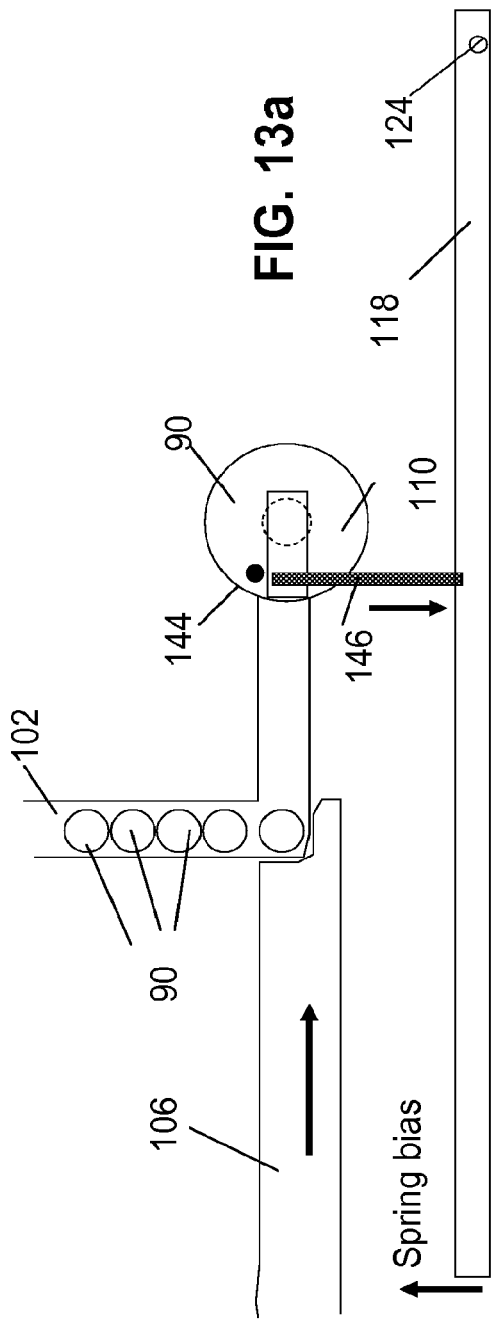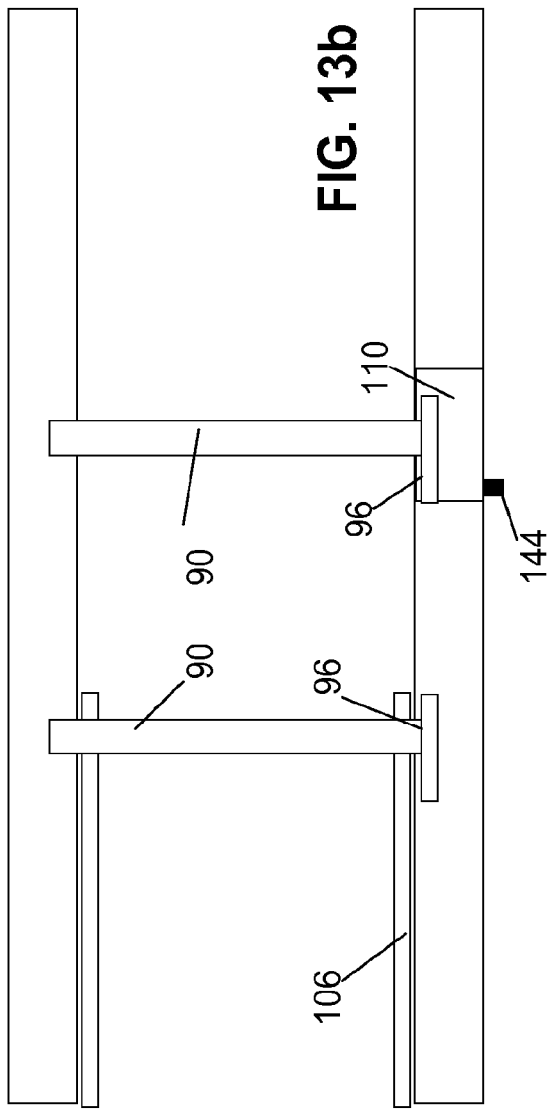

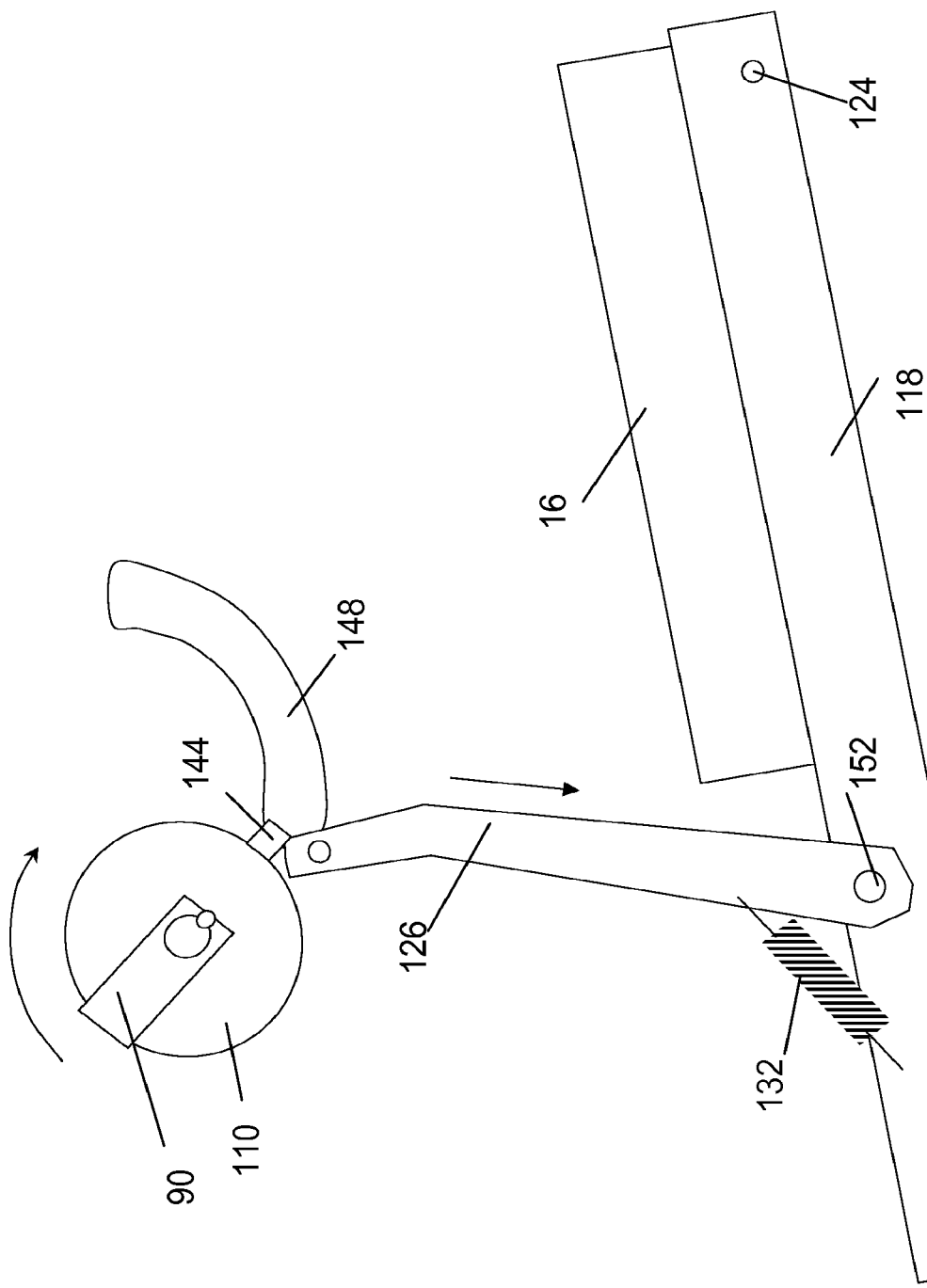

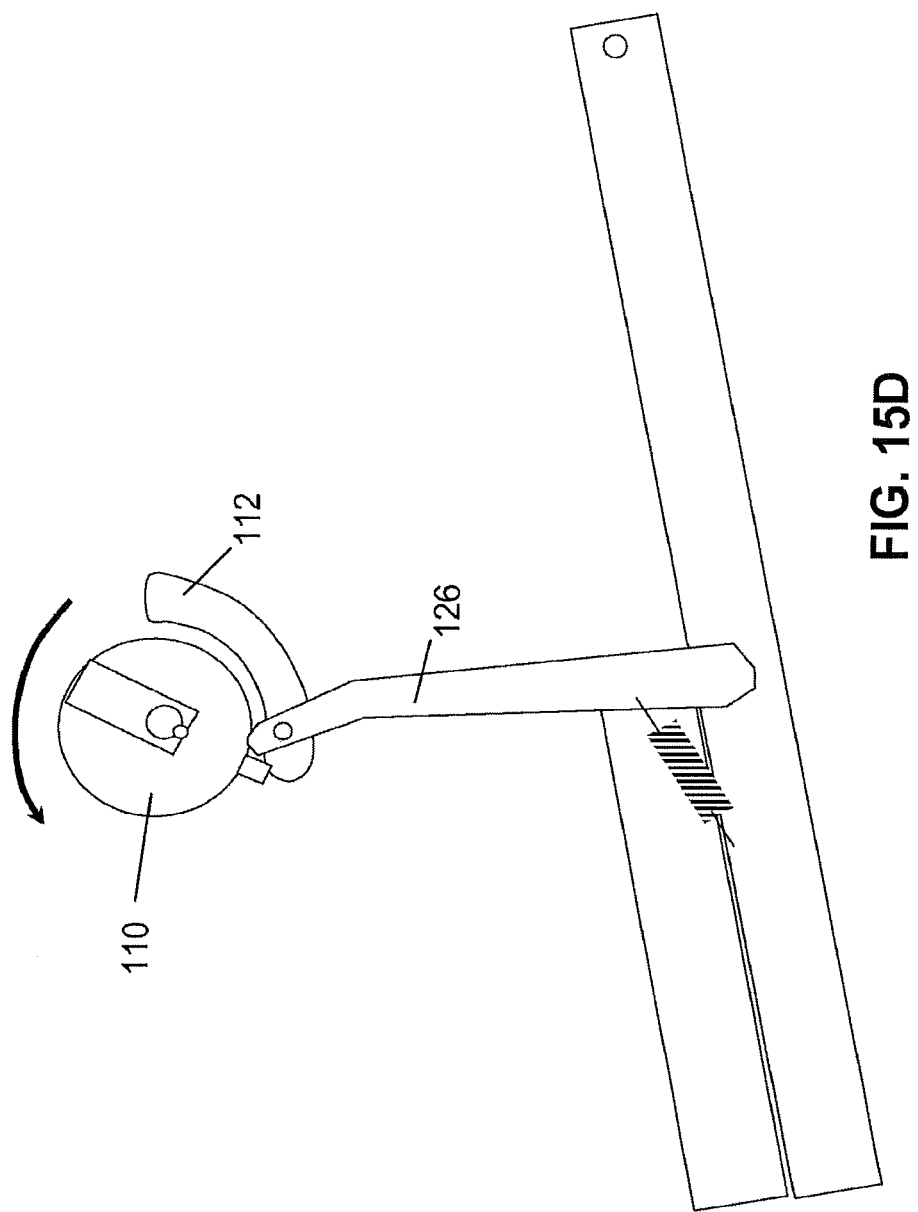

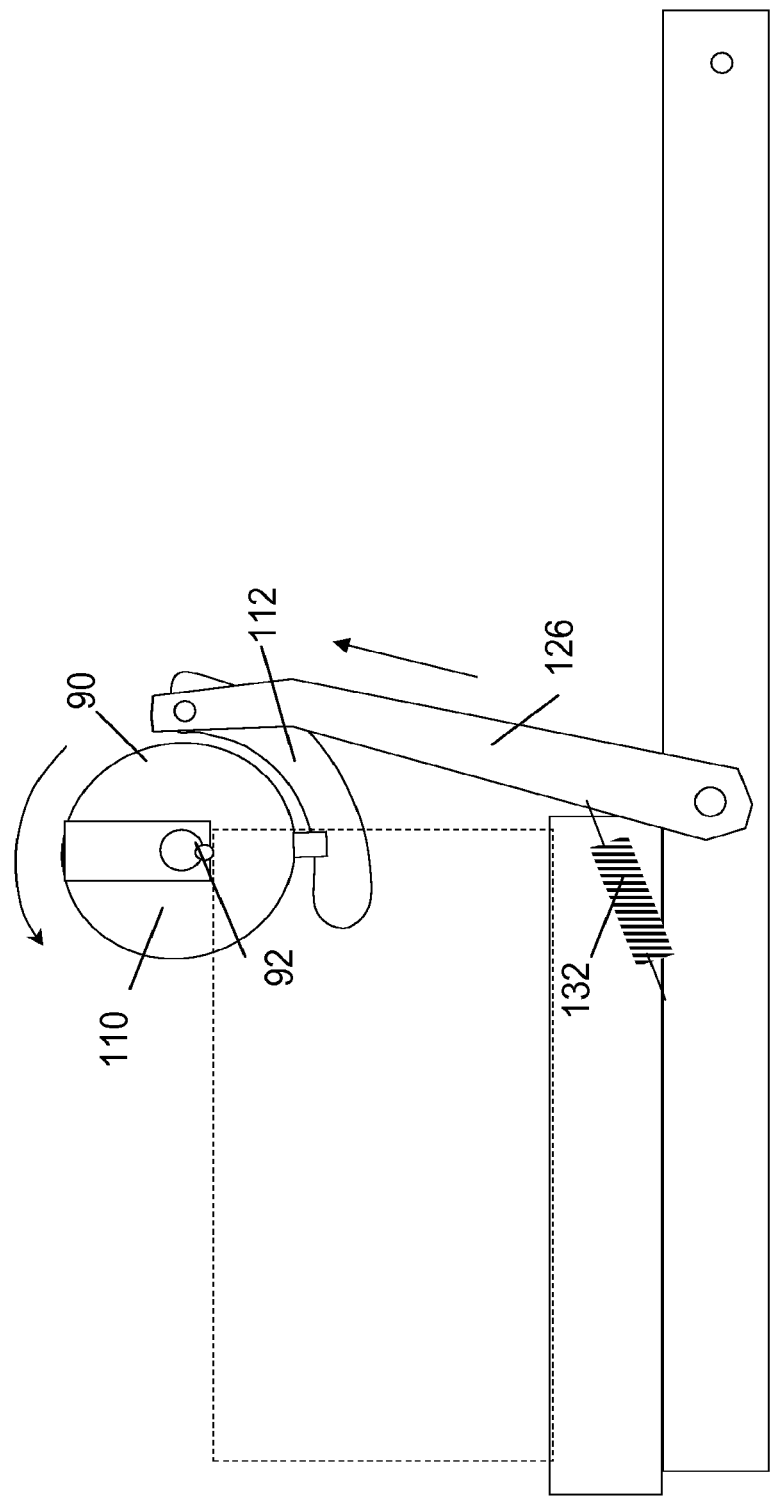

DEVICE AND METHOD FOR REMOVING A PEELABLE SEAL

CROSS REFERENCE TO RELATED APPLICATIONS

This is a continuation of U.S. patent application Ser. No. 13/284,437, filed on Oct. 28, 2011, which is a divisional application of application Ser. No. 12/045,644, filed on Mar. 10, 2008 (now U.S. Pat. No. 8,047,253), which claims priority of provisional application No. 60/946,799, filed on Jun. 28, 2007, 60/915,890, filed on May 30, 2007, and 60/894,188, filed on Mar. 9, 2007. This application is also related to U.S. patent application Ser. No. 12/637,597, filed on Dec. 14, 2009, (now U.S. Pat. No. 7,975,476). The disclosures of the above listed applications and patents are incorporated herein by reference in their entireties.

BACKGROUND

Laboratory analysis of chemical and biological samples is a time consuming process involving hundreds to thousands of samples for a typical test. The demand for such testing for drug development, diagnostic, analytical, and other applications have led to the development of laboratory automation systems that aspirate, mix, dispense, read and track identities, load and unload from low temperature storage units, among numerous other operations, according to the specific experimental and handling protocols on large numbers of samples. Current standards include plates that contain arrays of wells (96, in an 8×12 array, or 384, in a 16×24 array) that hold liquid samples during processing and transfers between robotic platforms. To keep the liquid solutions inside the wells, the plates are often heat sealed with a sheet, typically made from plastic or plastic coated aluminum foil, which is currently the most cost effective and easily applied method. A typical commercially available system for creating such seals is the PLATELOC® Thermal Plate Sealer from Velocity11 (Agilent Technologies, Menlo Park, Calif.). Simple adhesive backed sealing sheets are also available. Other sealing methods may also be used, but they tend to be more expensive, time consuming, and only marginally more effective, involving multipiece assemblies with cover locks, diaphragms, or other mechanisms.

The plates are transferred, heated, centrifuged, bead beaten, and other operations depending on the specific experimental protocol. After these processes are completed, access to the samples is required for testing and analysis, which is commonly achieved by piercing the seal over the desired well to aspirate the sample, or to peel off the entire seal to expose all of the wells. Piercing of the seal may be robotically friendly, but since resealing is achieved by applying a new seal other the pierced seal, there is a limit to the number of times the wells on a given plate can be accessed. After multiple piercing and resealing operations, the seal can become too thick to pierce.

Manually peeling back the seal from the entire plate can be time consuming since the seal sheet often tears into pieces unless the pulling force is very uniform. It can also create adhesive strings that cross wells, and jostle the open wells, both of which increase the chance of cross-contamination.

The need remains for a device and method for desealing well plates and other containers sealed with peelable seals that exploits that economical nature of the film seals yet permits ready access to and resealing of the plate. The present invention is directed to such a need.

SUMMARY

According to the present invention, a plate or tray containing wells that are sealed with a peelable seal is transported via a conveyor belt or platform along a processing path toward a desealing station at which an adhesive surface having a width substantially the same as or greater than the width of the seal is pressed against the upper surface of the peelable seal. A pressure surface, such as a rod or roller, applies a downward pressure on the adhesive surface, pressing it against the seal and keeping the plate in position on the conveyor as the plate slowly moves with the conveyor. As the leading edge of the seal passes the roller, the adhesive surface is rolled upward, away from the plane of the seal, pulling up on the leading edge of the seal to separate it from the plate while the plate is held down by the roller. The seal is gradually pulled away from the plate as the plate continues to move past the station by applying a uniform pulling motion that gently removes the seal without tearing the seal or jostling the plate. The removed seal remains attached to the adhesive surface to be rolled up and ultimately discarded.

In one aspect of the invention, the device for removal of a film from an object, comprises a processing surface; a collection rod disposed above the processing surface, the collection rod having a length substantially equal to or greater than a width of the object; an adhesive surface extending downward along the length of the collection rod; alignment means disposed on the processing surface for aligning the leading edge of the object relative to the collection rod and the adhesive surface; translation means for moving one of the object and the adhesive surface relative to the other in a direction parallel to a plane of the processing surface; and a mechanism for producing tangential upward forces at a downstream side of the collection rod so that the adhesive surface pulls up the leading edge and causes the film to be peeled upward away from the object as one of the object and the collection rod is moved from the leading edge of the film to a trailing edge of the film. In an exemplary embodiment, the adhesive is in the form of a heat activated glue strip and the device further includes a heat source for activating the glue strip. In another embodiment, the adhesive surface is an adhesive tape, and the device includes a source roll with unused tape, a pressure surface, a take-up reel for collecting used tape and removed film, where a tape path extends from the source roll, under the pressure surface, under the collection rod and ends at the take-up reel, and a driver motor to rotate the take-up reel to pull the tape from the source roll and through the tape path.

In another aspect of the invention, a device for removal of a film seal from one or more sealed containers comprises a take-up rod or roller having a length substantially equal to or greater than the width of the container or container array, an adhesive surface extending downward along the length of the body, a conveyor for moving the array along a conveyor path to align the take-up rod with a leading edge of the film seal, and a mechanism for rotating the roller so that the take-up rod and adhesive cause the film to be peeled upward away from the array as the array moves past the rod.

In a first exemplary embodiment, the adhesive surface comprises a roll of tape that is fed from a source roll and collected on a take-up roll. The source roll of adhesive tape is supported on a spindle or bar. The tape, which has a width substantially equal to or greater than that of the plate, adheres to the seal as the plate goes under a pressure roller or other surface or means (e.g., air pressure) capable of applying a downward force to facilitate adhesion to the upper surface of the seal. In some embodiments, the conveyor may pause to ensure that the adhesive has achieved good contact. As the plate goes under a second rod or roller, e.g., a collection or takeup rod, the tape is pulled upward to generate tangential forces at the downstream side of the rod that are substantially perpendicular to the plane of the seal. The tape is pulled up to a take-up reel, which is rotated by a drive motor. The seal is lifted along with the tape and pulled free of the plate. The removed seals are rolled up with the tape onto the take-up reel, thus minimizing the risk of cross-contamination of contents of the wells by inadvertent contact with the removed or partially removed seal. The take-up reel with the used tape will typically be discarded along with the seals once the source roll has been exhausted and is replaced. The use of a smaller diameter collection rod on the downstream side facilitates removal of the seal by increasing the pull angle on the tape. The pressure roller (or other pressure surface) may be shifted slightly downstream after the peeling has begun to further enhance the pull force applied by the collection rod. In one embodiment, the collection rod may be positioned at an angle, e.g., about 45°, relative to the leading edge of the plate to further enhance the ability to separate the seal from the plate by starting the peeling process at a corner of the seal. In the preferred embodiment, the collection rod changes the downstream tape path to an angle that is slightly off perpendicular relative to the conveyor path, e.g., in the range of 1° to 10°, and preferably on the order of about 2° to 3° from perpendicular.

The rate of removal of a seal is determined by the rotational speed of the take-up reel, which pulls the tape along the tape path, around the rollers and, if any, tape guides. The speed at which the conveyor moves the plate is coordinated with the speed of the take-up reel. Operation of both motors will be controlled by a system controller, which allows setting of the removal rate. Considerations for selection of appropriate desealing speeds include recent processing or handling of the plates. For example, if the seals or plates are wet, the desealing operation may be done at a slower speed to avoid spraying droplets of liquid across the open plate. In order to maintain consistent processing speeds during desealing operations on a number of plates, the rotational speed of the take-up reel is adjusted to compensate for its increased diameter as it accumulates the used tape and seals. Rotational speed of the take-up reel and/or the source reel can also be used by the system controller to calculate the number of seals remaining on the source reel to determine when the roll should be changed.

In an alternative embodiment, the present invention utilizes the principles of a sardine can, in which a key with an adhesive surface is attached to one end of the plastic seal and then rotated to wind up and remove the seal. While several different adhesives may be used in this embodiment, hot melt glue is preferred due to its adhesion properties in the presence of solvents, frost or water. In an exemplary embodiment, a magazine of disposable "keys", a key a cylindrical rod with a head for rotating the rod, is loaded into the device. A key is pushed forward out of the bottom of the magazine, in a manner similar to a PEZ® candy dispenser (see, e.g., U.S. Pat. No. 2,620,061). This key is pushed into a slot which can rotate the head of the key. If hot melt glue is used, the key is rotated to face a heat source to bring the glue to the melting point. The key is then rotated down to face the end of the plate with seal in place. The plate is properly positioned and then raised to contact the glue to the seal, or the key is moved downward to contact the seal. After a short delay to allow the glue to cool, the key is rotated as the plate continues forward along the conveyor, lifting upward along a tangent to the key to gradually remove the seal by rolling it up around the cylindrical rod, then pulling the key away from the plate. The open plate continues on the conveyor path, past the desealing station. The key and removed seal are discarded to a waste receptacle and a new key loaded from the magazine in preparation for the next plate.

In one embodiment, a relative height adjustment means is included to vary the spacing between the key mechanism and the conveyor mechanism to permit use of the system with different thickness plates.

The present invention provides means for pulling the film sheet with uniform pressure, avoiding the problems encountered when attempting to manually remove the sheet. Because the seal can be more easily removed using the inventive device and method, it can be applied more firmly to the well plate to provide better protection against contamination or loss of samples.

BRIEF DESCRIPTION OF THE FIGURES

FIGS. 3a-3c are diagrammatic side views of a first embodiment of the desealer at three different stages of the removal process: FIG. 3a shows initial contact between the tape and the seal surface, FIG. 3b shows the seal as it begins to peel off of the plate; and FIG. 3c shows a pressure rod moving toward the lift roller.

FIG. 4 is a diagrammatic top view of an embodiment of the invention.

FIG. 5 is a diagrammatic top view of an alternative embodiment of the desealer with an angled tape feed.

FIG. 6 is a diagrammatic side view of the embodiment of FIG. 5.

FIG. 7 is a diagrammatic side view of an alternative embodiment of the desealer with pinch rollers.

FIG. 9a is a diagrammatic view of a key in position for attachment to the plastic seal sheet on top of a well plate.

FIGS. 9b and 9c are perspective views of alternative embodiments of the key.

FIGS. 10a-10c are diagrams showing the steps for dispensing the key, activating the key adhesive and applying the key to the plate seal sheet, respectively.

FIGS. 13a and 13b are side and top diagrammatic views, respectively, of the conveyor for transporting the plates and the pusher mechanism for moving the key across the plate.

FIGS. 15a-f diagrammatically illustrate an exemplary steps in the operation of a mechanism for moving the conveyor to permit introduction of the plate.

DETAILED DESCRIPTION

Figure 1:
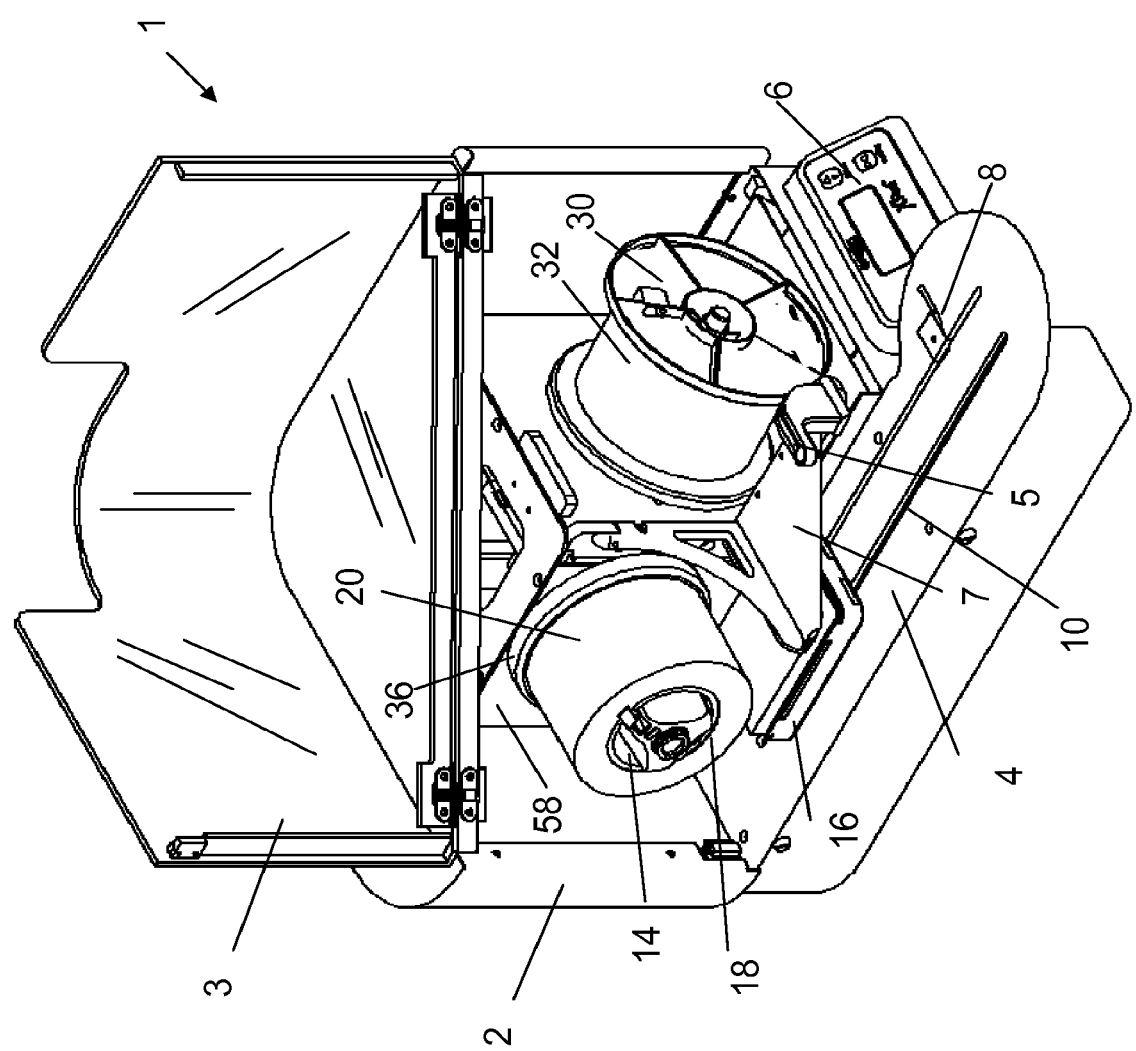
FIG. 1 is a perspective view of a system constructed according to the present invention.

For purposes of the present description, the direction of the movement or relative position of the tape or the plate (or other sealed container) will be described in terms of "upstream", meaning toward the side where the tape or plate travel begins, and "downstream", meaning toward the side where the tape or plate travel terminates. The "array" or "plate" referred to in the following description is for illustration purposes only. The present invention is not intended to be limited to the processing of multi-well plates or similar arrays, but may be used for virtually any kind of container or object from which a peelable film is to be removed.

In a first embodiment of the invention shown in FIGS. 1 through 5, adhesive tape is employed to remove seals. A source roll 20 of adhesive tape is supported on a spindle or axle 18 above the processing surface 4 and plate conveyor 10, which transports the plate 16 (or other sealed container) from right to left along processing surface 4 as illustrated in FIGS. 3a-3c. In the exemplary embodiment, conveyor 10 comprises a motor-driven belt linked to a conveyor car 11 (shown in FIG. 8) that retains the plate or other object and slides across the processing surface 4 when the conveyor motor is activated. The tape 22, which has a width substantially equal to or greater than that of the seal 40, adheres to the seal as the plate 16 passes under the pressure rod 24 on the right (upstream side) as illustrated. The pressure rod or roller 24 presses the adhesive side of the tape 22 against the upper surface of the seal 40, as shown in FIG. 3a. It should be noted that while a roller may be preferred, the function of a pressure roller can also be performed by any surface that can apply the desired pressure to enhance the effectiveness of the adhesive. For example, a rod, bar or planar surface can be used. In one embodiment, the surface can have a foam contact area to help spread the applied pressure by conforming to the surface of the seal.

Figure 3A:
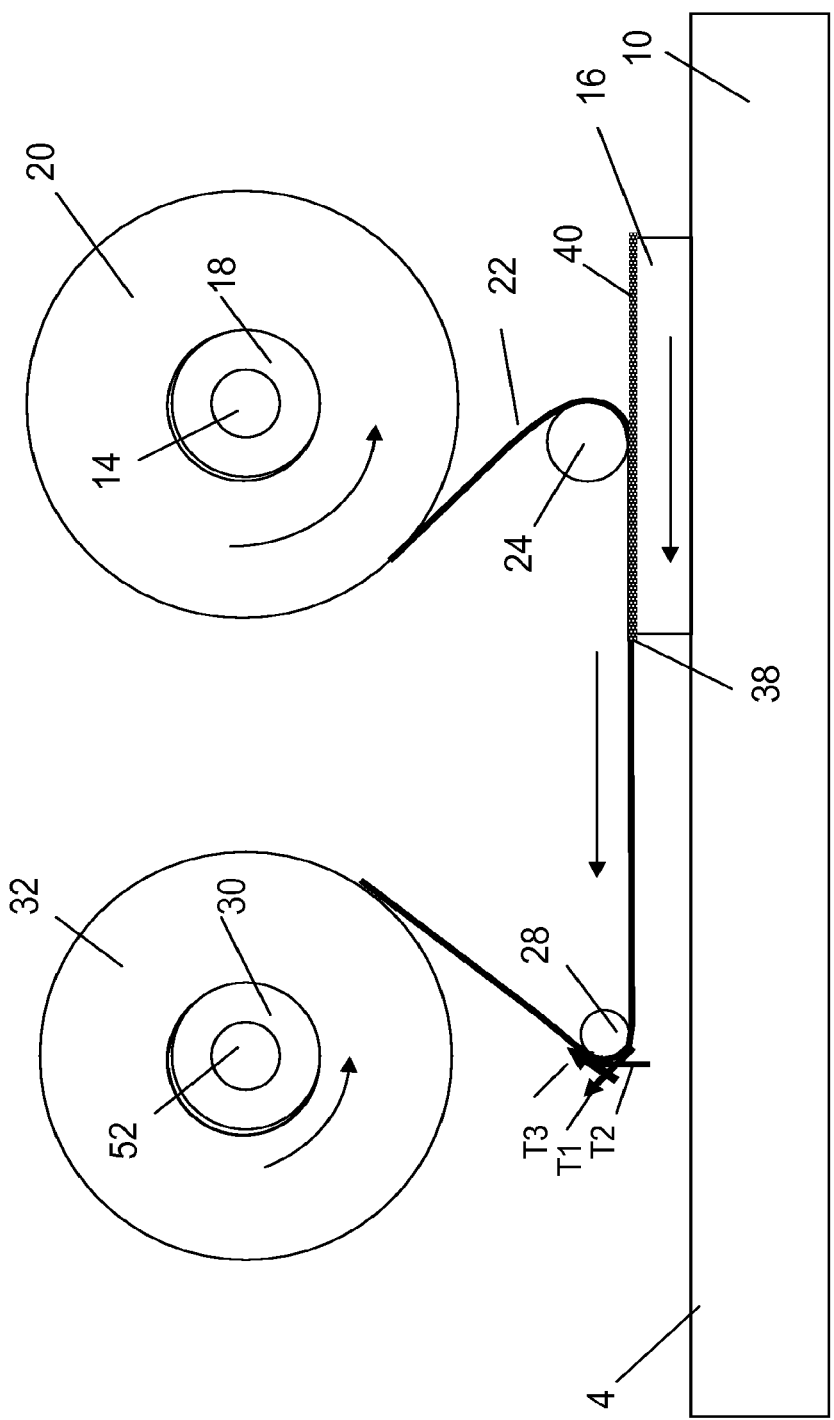

The tape 22 follows a path under and around a second rod or roller, also referred to herein as collection rod 28, and upward to a take-up reel 30. Collection rod 28 should have a smooth surface with rounded edges on its downstream side so that the tape pulls uniformly across it. The collection rod 28 need not be an elongated cylinder, but may be in the form of a flat bar or plate having a smooth, rounded surface at the point at which the tape 22 pulls across the edge, thus serving the same function as a rod. As the plate 16 moves forward and the leading edge of the seal passes under the collection rod 28, the seal 40 is pulled upward by forces that are tangent to the downstream or trailing side of the collection rod 28, as exemplified by T1, T2 and T3 in FIG. 3a, lifting the leading edge of the seal to gradually peel back the seal as the plate proceeds past the collection rod 28, as illustrated in FIG. 3b. The removed seal 40 remains adhered to the tape to be rolled up with the tape 32 onto the take-up reel 30. Once the source roll has been consumed, or, if appropriate, prior to complete exhaustion of the source roll, the take-up reel 30 with the used tape 32 can be removed from the take up spindle and discarded along with the used seals. The selection of a relatively smaller diameter for the collection rod 28 facilitates removal of the seal 40 by increasing the pull angle on the tape. The collection rod 28, which is preferably configured to rotate or roll to ensure uniform pulling of the tape, typically has a diameter of 2-3 mm. As an alternative to using a collection roller, a nonrotating collection rod can be used as long as it has a relatively low friction surface, e.g., rounded and smooth, to avoid uneven forces across the width of the tape. Accordingly, for purposes of the present invention, the term "collection rod" shall include a rod, a roller, a flat surface having a rounded edge, and any equivalent structure with the properties necessary to allow the tape to be pulled across it smoothly with uniform forces and without damaging the tape.

The pressure rod 24 may be mounted to allow it to be shifted toward the left, i.e., downstream, in the direction of plate travel, after the peeling has begun to further enhance the pull force applied by the collection rod 28. In one embodiment, a strip of foam extending downward from a rigid support suspended above the plate path, may be used in place of or in addition to the pressure rod 24 to initially push the tape 22 down onto the plate 16 at its leading edge. The foam should be rigid enough to apply pressure but sufficiently compliant to ensure that the tape 22 is in good contact with the seal 40. It may be desirable to pause the forward motion of the plate 16, holding it in the initial contact position at the leading edge of the seal for several seconds before resuming motion, to ensure that the tape has a solid grip on the seal.

In a preferred embodiment, the collection rod 28 is positioned at an angle, e.g., about 45° relative to the leading edge of the plate 16, which is a skewed angle relative to a leading edge of the object, as illustrated in FIGS. 4 and 5, to facilitate separation of the seal 40 from the plate 16 by initiating the peeling process at a corner 42, and peeling the seal of fat an angle of about 45°. This approach avoids the need to overcome the strength of the adhesive along the entire width of the leading edge 38 of the seal 40 at the same time, and is more representative of how the seal would be removed in a manual operation. The angled collection rod 28 causes the tape path to change to a direction that is approximately perpendicular to the original tape path as well as the direction of plate transport. Another advantage of the change in tape path direction is that the discarded seals accumulating on the take-up reel 30 are positioned to the side and not above the plate 16 and conveyor 10, thus minimizing the chance that any contaminating liquid that remains on the bottom of the seals will drip back into the next plate. As illustrated, the angle at which the tape path is redirected is generally on the order of 90°± about 10°. More preferably, the angle will be 90°±2-3°. In the preferred embodiment, a sponge or absorbent material may be incorporated adjacent the collection rod 28, or near the take up reel 30 to further avoid cross-contamination. Alternatively, vacuum tubes or channels may be mounted on opposite sides of the tape at or downstream from rod 28 in situations where significant amounts of liquids could remain on the tape or removed seal.

A drive motor 50, such as the one illustrated in FIGS. 4 and 5, rotates take-up spindle 52 to drive the desealing operation by pulling the tape from source roll 20 and along the tape path. To ensure that no slippage occurs and that uniform pulling force is applied, the spindle 52 should have one or more radially extending tab, ridge or spring to mate with a corresponding notch on the inner surface of take up reel 30.

The rate of removal of a seal from a plate is determined by the rotational speed of the take-up reel 30, which pulls the tape along the tape path, around the rollers 24 and 28 and, if any, tape guides. The speed at which the conveyor 10 moves the plate 16 is coordinated with the rotational speed of the take-up reel 30. Operation of both the conveyor and the drive motor 50 will be controlled by a system controller (not shown), which allows the removal rate to be set. A typical operating speed would be about 30 cm/second (1 foot/sec.). Considerations for selection of appropriate desealing speeds include recent processing or handling of the plates. For example, if the seals or plates are wet, the desealing operation is preferably done at a slower speed to avoid splashing droplets of liquid across the open plate. In order to maintain consistent processing speeds during desealing operations on a number of plates, the rotational speed of the take-up reel 30 can be adjusted to compensate for its increased diameter as it accumulates the used tape and seals. Rotational speed of the take-up reel 30 can also be used by the system controller to calculate the number of seals remaining on the source roll 20 to determine when the roll should be replaced.

The tape used in the present invention will typically be a conventional plastic backed pressure sensitive adhesive that is selected to maximize adhesive strength while minimizing its tendency to adhere to itself. The width of the tape should be approximately the same as the width of the seals, but some slight variability may be possible as long as there is sufficient width to effectively lift the entire seal. The tape should be of sufficient strength, and possibly reinforced, to minimize the risk of breakage.

In an alternate embodiment, the tape adhesive may be heat activated, or a combination of pressure sensitive and heat augmented. The use of heat has the advantage that the tape will adhere to seals that might have moisture or some chemical residue, such as DMSO, on the surface. Heating can be achieved by positioning a heat source immediately downstream from the pressure rod 24, or the roller itself could be heated. It may be appropriate to briefly halt the rotation of the take-up reel and forward movement of the conveyor to allow the tape and adhesive to cool before applying a lifting force to the tape.

In one embodiment, the source roll and take-up reel can be combined into a disposable cartridge, somewhat like a VHS video tape, to facilitate replacement by the user. Where the take-up reel is positioned at an angle (90°±X°) relative to the direction of plate movement, the cartridge would be appropriately shaped, e.g., L-shaped, to retain the reels in their desired positions. The cartridge could be made from inexpensive molded plastic parts with cardboard and metal parts as appropriate to minimize cost.

Optional window and measurement means can be included to allow the user to determine the number of seals that the remaining tape can remove. Alternatively, the instrument can make a record of the number of seals removed to predict the number remaining on a cartridge. This would also be useful for an arrangement when using separate source rolls and take-up reels. A fresh source roll or cartridge might be put on in the evening, for example, to ensure that the system could run without attention through the night. The next day a partially full cartridge or roll could be re-installed to use any remaining capacity.

Figure 2:
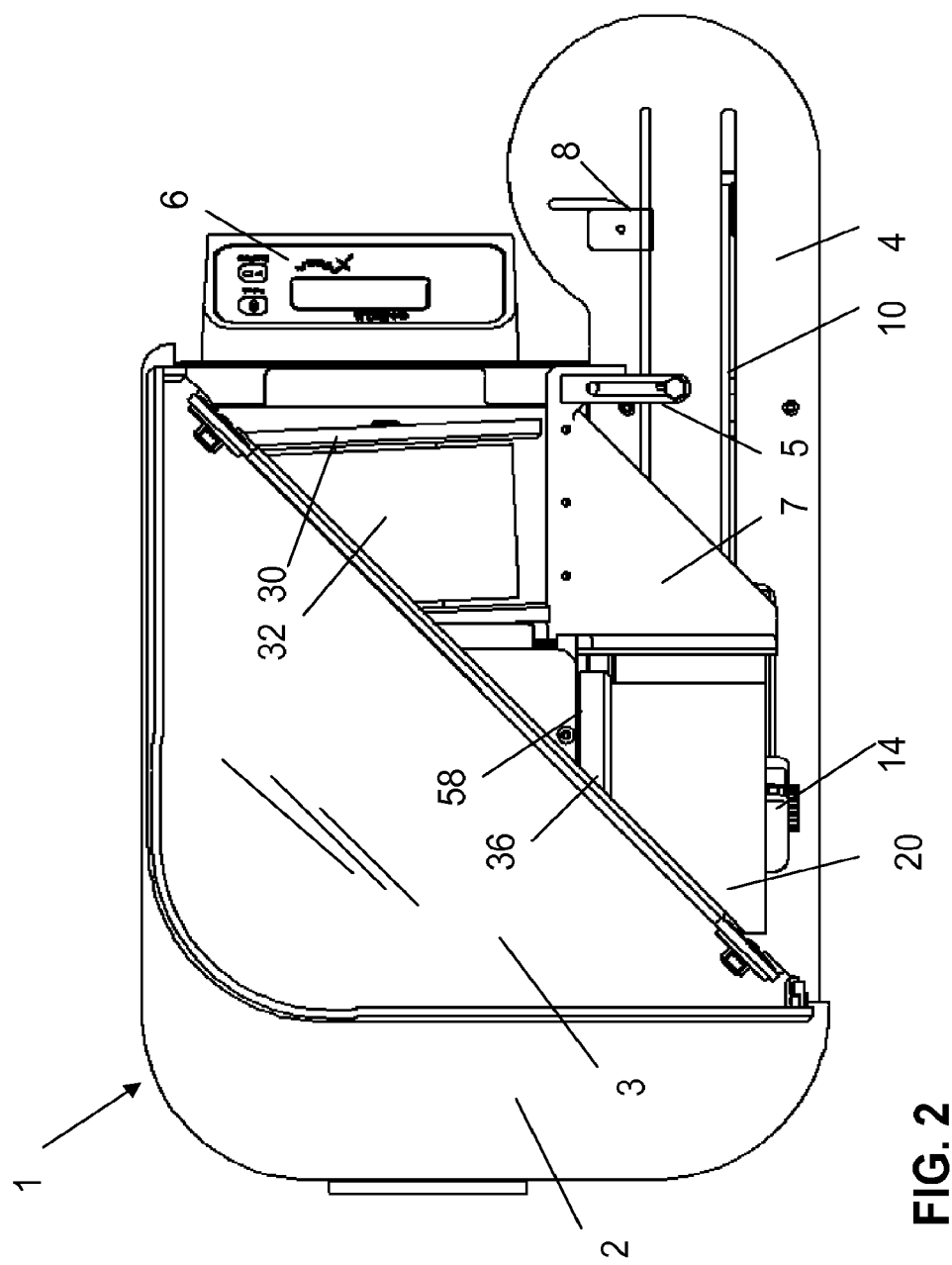
FIG. 2 is a top view of the system of FIG. 1.

FIGS. 1 and 2 illustrate an exemplary instrument 1 utilizing the principles of the present invention. Source roll 20 has a source core 18 which fits onto source spindle 14 extending from source flange 36. Source core 18 slides over spindle 18 to form an interference fit to provide sufficient resistance to allow the tape 22 to be pulled from the roll 20 while keeping the tape taut for uniform application to the seal 40. Alternatively, notches in source core 18 can mate with tabs or springs in spindle 18 to prevent slippage of the source roll and ensure uniform feeding of the tape. An optional detector may be included to monitor the amount of tape remaining on the source roll 20 to provide a signal to a system controller allowing it to determine how many more seals can be removed using the roll. Take up reel 30, which is positioned at about 87°-88° relative to the original tape path direction and the direction of movement of the plate 16, has side flanges to facilitate centering of the used tape 32 and seals and also to assist with containment of residual materials that might remain on the removed seals and used tape. An optional shield 7 is placed over the point at which the seal is pulled back to protect against cross-contamination of the newly-opened wells and to prevent inadvertent contact with materials that may remain on the bottom surface of the removed seal.

Conveyor 10 transports the plate 16 forward (from left to right as illustrated) along conveyor surface 4, beginning at a position below the source roll 20. A previously described, the rate of operation of the device is determined by the rotational speed of the take-up reel 30. The conveyor 10 is controlled simply to keep the plate 16 moving at the same speed as the tape. An optical detector 5 extends partially over the conveyor surface 4 to confirm that the seal has been removed. Typically, the optical detector will be looking for the reflectivity of the tape by viewing a relatively large portion of the area below it. High reflectivity on the plate will indicate that some part, and possibly all, of the seal was not removed. The controller may be programmed with a threshold for determining the level of reflectivity that would be acceptable, including situations where a portion of the seal might remain. If an unacceptable remnant of seal is detected, the system controller (not shown) will generate a signal (audible or visual) indicating that the seal removal was incomplete. The controller may also, or alternatively, generate an electronic signal to activate an attached robot for removing the plate and either repeating the desealing process or placing the plate at a station for further disposition and handling.

The tape reels, motors and conveyors are all retained within a housing 2 that has an openable protective cover 3 to minimize contamination or inadvertent contact with moving parts within the device. The cover 3 is shaped with a notch corresponding to the conveyor path to allow plates to exit the device without requiring the cover to be opened.

To be more robot friendly, the conveyor car 11 (which is illustrated only in FIG. 8 but will be in other embodiments directly underneath plate 16) can optionally be presented in portrait or landscape positions at the end of its travel by a user selectable switch 8 in its track as illustrated in FIGS. 1 and 2. This feature allows a robot to grip the plate 16 along the long or short edges depending on the robot's gripper orientation.

Control panel 6 includes START/STOP buttons and a display to indicate various messages such as completion/effectiveness of the seal removal, amount of tape remaining, or the number of seals that can be removed with the remaining tape, as well as provide for input of control parameters such as seal and plate sizes, seal removal speed, delays for adhesive setting, and more. In one embodiment, rather than actually detecting the amount of tape remaining on the source roll, the controller can calculate the remaining tape by counting the number of seals removed, tracking the rate of feed of the tape, and utilizing the seal dimensions.

To ensure that fresh tape is always applied to the leading edge of a plate, the instrument may monitor elapsed time (or the fact that a new cartridge or roll has been installed). For optimal adhesion, the drive motor will be triggered to automatically advance the tape to a fresh location should too much have time elapsed before the next plate is presented for seal removal. A exemplary delay that would prompt this "freshening" action would be on the order of 8 hours or more.

As illustrated in FIG. 6, the cartridge and motor can be mounted on a common frame 58 which can be raised or lowered by motor 60 relative to the conveyor 10 to enable it to process plates of different heights. Conveyor 10 advances the plate 16 to put the leading edge of the plate just below the pressure rod 24, which is part of the cartridge. Various pressure settings may be allowed to improve adhesion of the tape to the seal. A delay of a few seconds can also be allowed to permit the tape adhesive to set to improve adhesion. Then, the take-up reel (not shown in this figure) and the conveyor 10 are both operated to remove the seal 40 and continue advancing the plate 16 to the output side, in this case, the left side of the conveyor surface.

In one alternative embodiment, the conveyor 10 can be eliminated, with the motion provided manually by a user sliding the plate 16 forward on the processing surface 4 under the collection rod after first aligning the plate with guides, e.g., a pair of rails, that are separated by a distance slightly wider than the plate, located on the processing surface 4. The manual pushing of the plate should generally be a uniform motion that is consistent with the rate at which the tape-up reel is rotated to advance the tape along the tape path. In a second alternative "manual" configuration, a fixed guide or frame can be disposed on the surface for firmly and releasably retaining the plate. The source roll, collection rod and take-up reel can then be mounted on a plate or frame, similar to common frame 58, on a motor or manually powered horizontal slide that allows the collection rod to be moved backward from the leading edge to the trailing edge of the plate to peel off the seal.

In an embodiment for use in larger laboratories that require desealing operations to be run unattended overnight it may be necessary to increase the capacity of tape to allow desealing of 1000 or more plates. Simply enlarging the take up reel fails to accomplish this because the large roll of used seals and tape may be too soft to be driven with the consistent torque required to perform the desealing operation.

Figure 8:
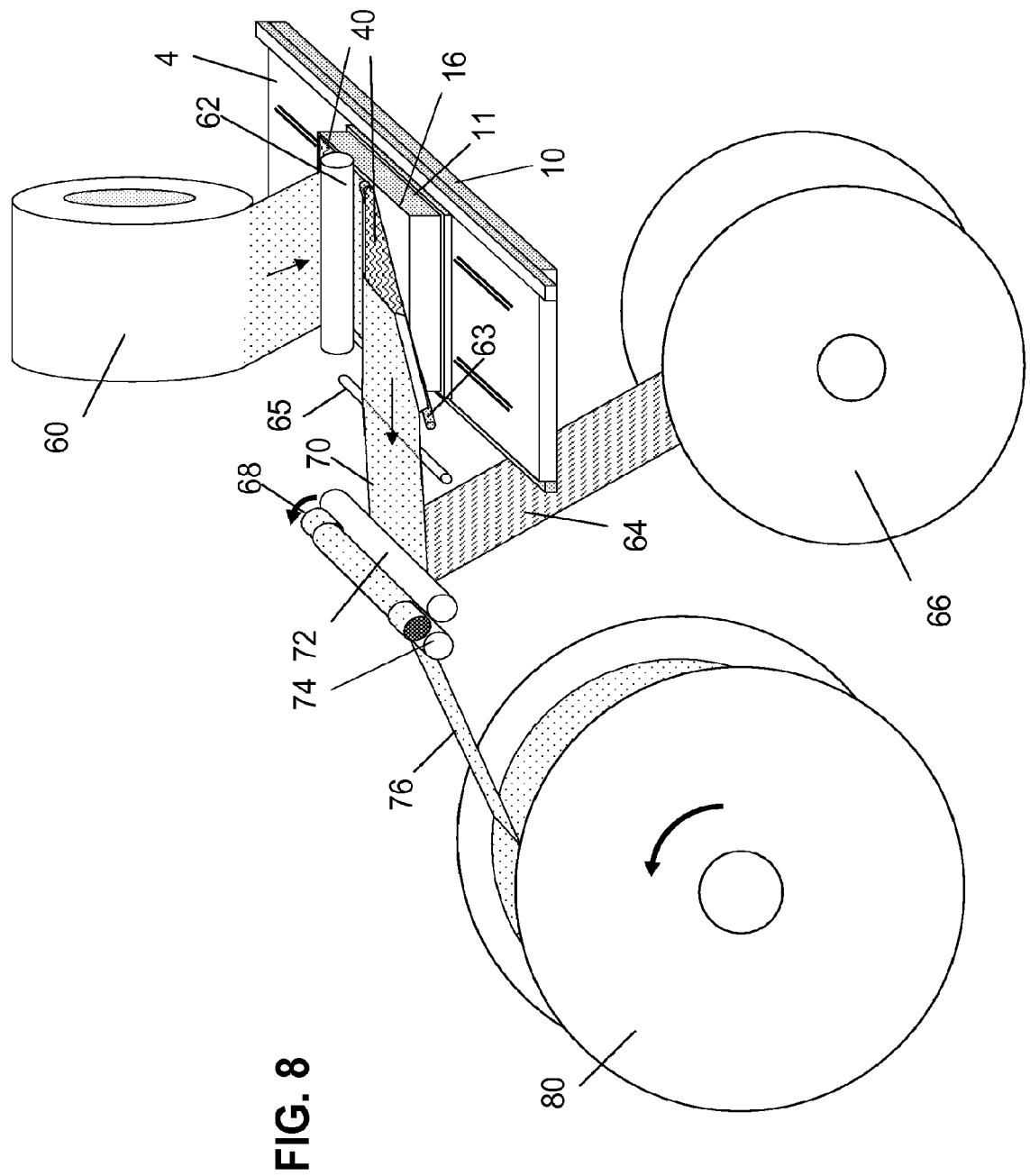
FIG. 8 is a diagrammatic perspective view of the embodiment of FIG. 7.

To address this problem, a system of pinch rollers may be included to pull the tape, while the take-up reel simply takes up the slack, as in the embodiment illustrated in FIGS. 7 and 8. Similar to the first embodiment, a source roll 60 feeds tape underneath pressure roller 62, which presses the sticky side of the tape onto the seal 40 of plate 16 as it is transported by conveyor 10. Take-up rod 63 is preferably disposed at an angle relative to the direction of travel so that the seal 40 is lifted first at one corner to facilitate removal. The tape 70 with the removed seal is guided by guide roller (or rod) 65 into a set of pinch rollers 68, 72 and 74. Roller 68 is a drive roller, which is driven by a drive motor (not shown) to provide the pulling force for the peeling operation. Because there is adhesive on one side of the tape 70, to prevent fouling of the rollers, a consumable paper roll 66 is provided to feed paper 64 to provide a backing to cover the adhesive before it enters the pinch rollers. The paper backing provides an additional advantage of absorbing any liquid that may have been left on the used seals. The layered waste tape 76, consisting of the adhesive tape, removed seal and paper backing, is collected on take-up reel 80. As indicated in the figures, the relative size of take-up reel 80 is larger than the paper reel 66 or source reel 60 because it is receiving a 3 ply tape that is thicker than any of the single starting tapes. A separate drive motor (not shown), or a linkage driven by the same drive motor that rotates drive roller 68, is used to take up slack in the tape 76. The rotational speed of the take-up reel 80 will be adjusted as the diameter of the used tape 76 on the reel increases. It should be noted that pinch rollers may be utilized on smaller volume devices, such as the first embodiment, as well as in larger capacity systems.

In an alternative embodiment of the invention, the continuous rolls of adhesive are replaced by individual disposable rollers, or "keys", each of which is used to remove a single seal. As illustrated in FIGS. 9a-9c, each take-up key 90 has a take-up rod 94 and a key head 96. Preferably, the rod 94 is cylindrical, i.e., having a circular cross-section, to ensure uniform pressure throughout the operation, however, other shapes may also be used. A strip of adhesive 92 extends along the length of rod 94. While several different adhesives can be made to work, hot melt glue is superior in many cases since it has better adhesion properties in the presence of solvents, frost, or water. Adhesive strip 92 is pressed against the seal 40, and once the adhesive has set sufficiently, the key 90 is rolled towards the trailing edge of plate 16, e.g., clockwise as illustrated in FIG. 9a, as the plate advances to remove the seal in a manner similar to opening a sardine can. A gripping means for rotating the key is provided in the form of a tab 98 (FIG. 9b), a square head 96 (FIG. 9c) or other configuration that allows control of the key rotation. This gripping means is manipulated by an automated rotating mechanism which will be described in more detailed below.

Figure 14:
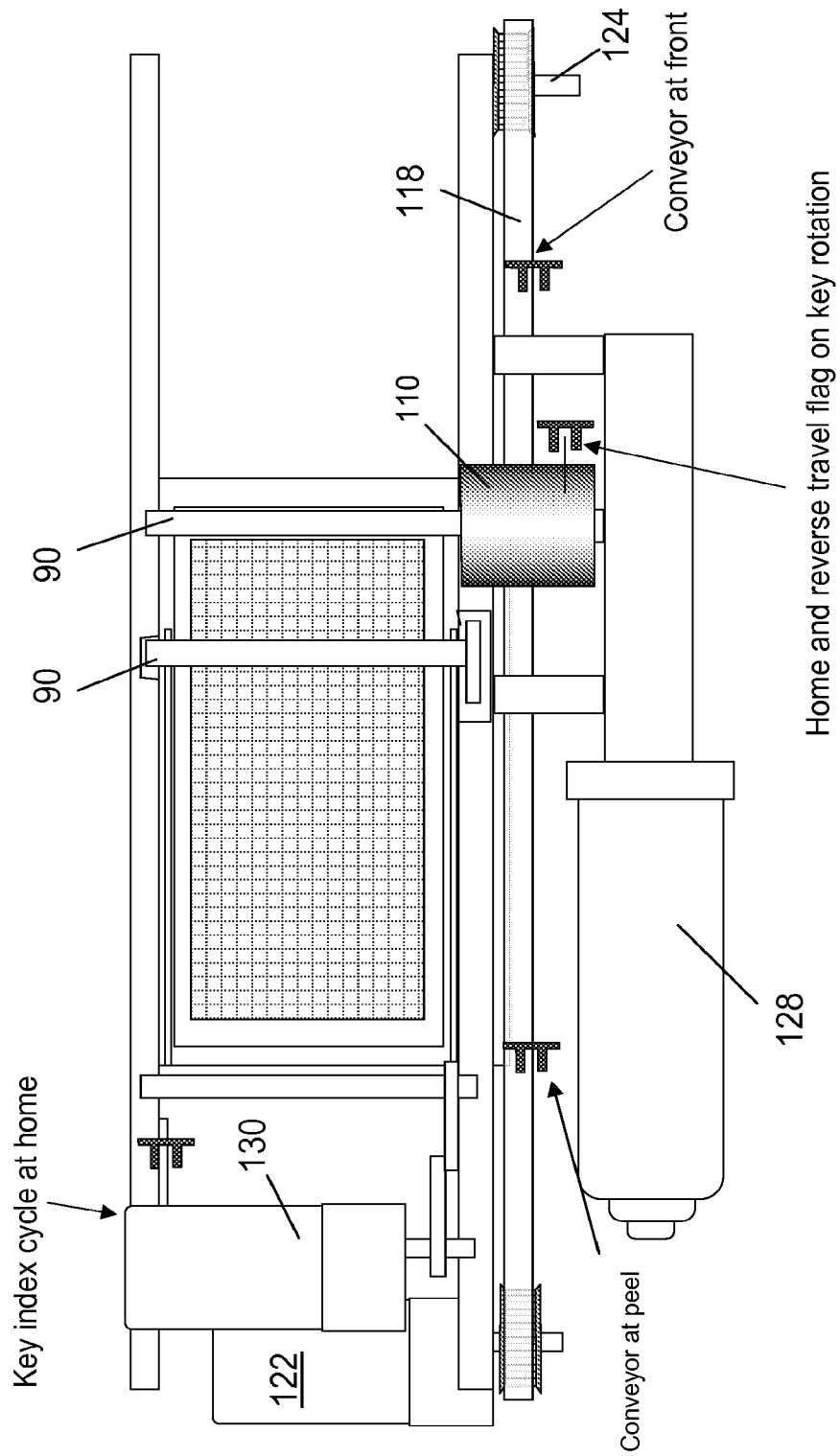
FIG. 14 is a top view of the system for removing the plate seal.

As shown in FIG. 10a, an automated dispenser 100 holds a plurality of keys 90 in a magazine 102 of disposable keys. A key 90 is pushed forward by key pusher 106 out of an opening 104 in the bottom of the key magazine 102, so that the dispenser functions much like a PEZ® candy dispenser. Key pusher 106 is driven by motor 130, shown in FIG. 14. The head of the key 90 is pushed into a corresponding slot 108 in a key rotator. As illustrated, the key heads are rectangular in shape, fitting into a rectangular slot in key roller 110, however, the only requirement is that there be some means for controlling the amount and direction of rotation of the key. The key rotator 110 is supported within an arcuate rotation channel 112 and driven by a belt connected to a motor 122 (shown in FIGS. 11 and 14). The drive motor 122 is activated and the key is rotated until stop tab 114 contacts rotation stop 116, which causes the glue strip 92 to be exposed to a heat source 120, shown in FIG. 10b, to bring the glue to its melting point. The key 90 is then rotated so that the glue strip 92 is facing the conveyor. The plate 16 is aligned with the glue strip 92 and then placed in contact with the glue 92, as shown in FIG. 10c.

Figure 11:
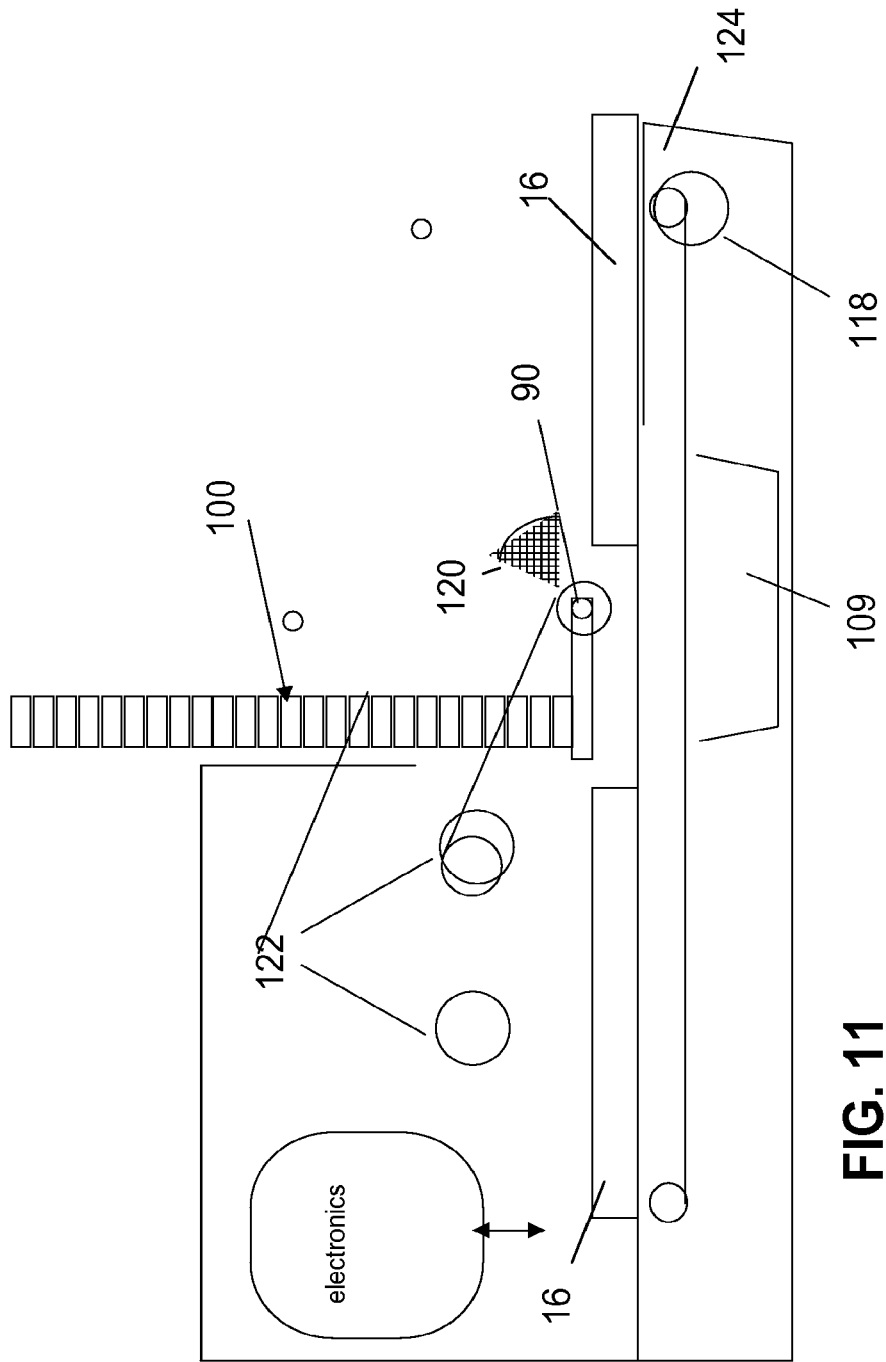
FIG. 11 is a diagrammatic side view of the system for automated removal of plate seals according to one embodiment of the present invention.

As illustrated in FIG. 11, the plate 16 is transported on a conveyor 118 (driven by motor 128) that has a pivot 124 at one end, which allows the conveyor to be tilted up or down to bring the plate 16 into or out of contact with the key 90. Normally, the conveyor 118 will be biased upward by a spring (shown in FIGS. 15a-f). After the seal on the plate 16 has been brought into contact with the glue strip, and a short delay to allow the adhesive to cool, the key rotator 110, driven by a belt or other linkage to motor 122, rotates the key 90 while the plate 16 advances, so that the seal is gradually and uniformly peeled away from the plate 16. After the trailing edge of the plate has moved past the key 90, the key with the removed seal is ejected and dropped into a waste bucket 109 positioned below the assembly. A new key is drops from the key magazine 102 and is loaded into the key rotator 110 in preparation for the next cycle.

Figure 12:
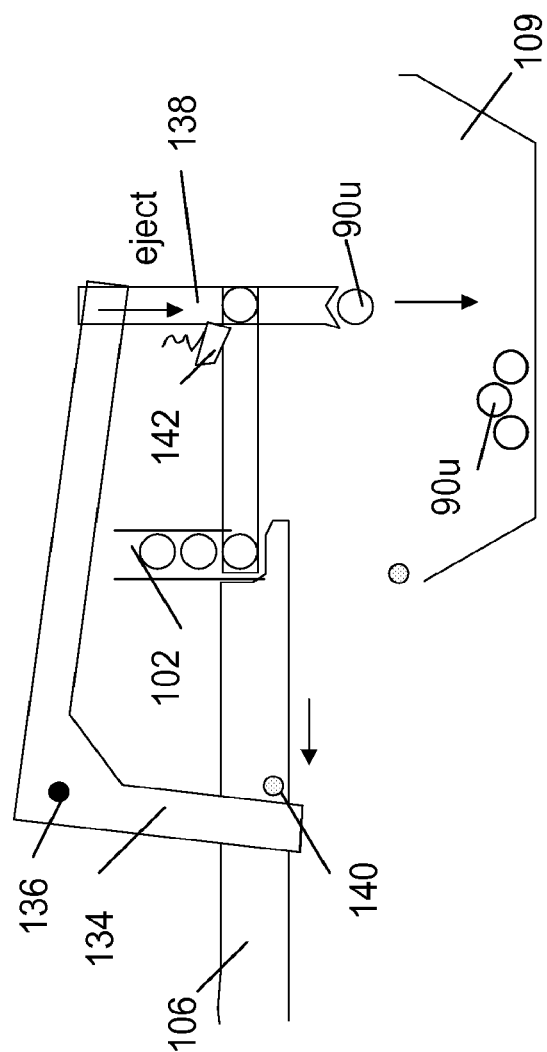
FIG. 12 is a side diagrammatic view of the key ejector mechanism.

FIG. 12 illustrates an exemplary mechanism for ejecting the used keys. Once the seal has been rolled up onto the used key 90u, the key rotator 110 is rotated so that slot 108 is oriented downward. Key pusher 106 is pulled back away from the dispensing position so that ejector trigger 140 cams against the lower section of arm 134. As the lower section of arm 134 is pushed back, the arm 134 pivots at ejector pivot 136 to cause the upper section of arm 134 to move downward, driving down key ejector 138. The lower end of key ejector 138 forces the head of used key 90u out of slot 108 so that the used key falls into waste receptacle 109. A spring tab 132 prevents the used key 90u from sliding back into a loading chute at the bottom of magazine 102.

FIGS. 13a and 13b illustrate the mechanism for forcing the conveyor 118 downward after the seal has been removed to allow removable of the plate 16. The conveyor 118 is normally biased upward by a spring, so the spring bias must be overcome when the plate has been de-sealed. The key rotator 110 is rotated in reverse so that a pivot trigger 144 is placed in contact with and forced against conveyor pivot pin 146. The pivot pin 146 is rigidly attached to a frame or other structure on the side of conveyor 118, so that the downward force on the pin 146 forces the entire conveyor to pivot on conveyor pivot 124. This increases the spacing between the conveyor and the desealing components, allowing the plate 16 to be more readily accessed and moved without inadvertent tipping or contact with the components of the desealer that would be located above the plate.

Figure 15A:
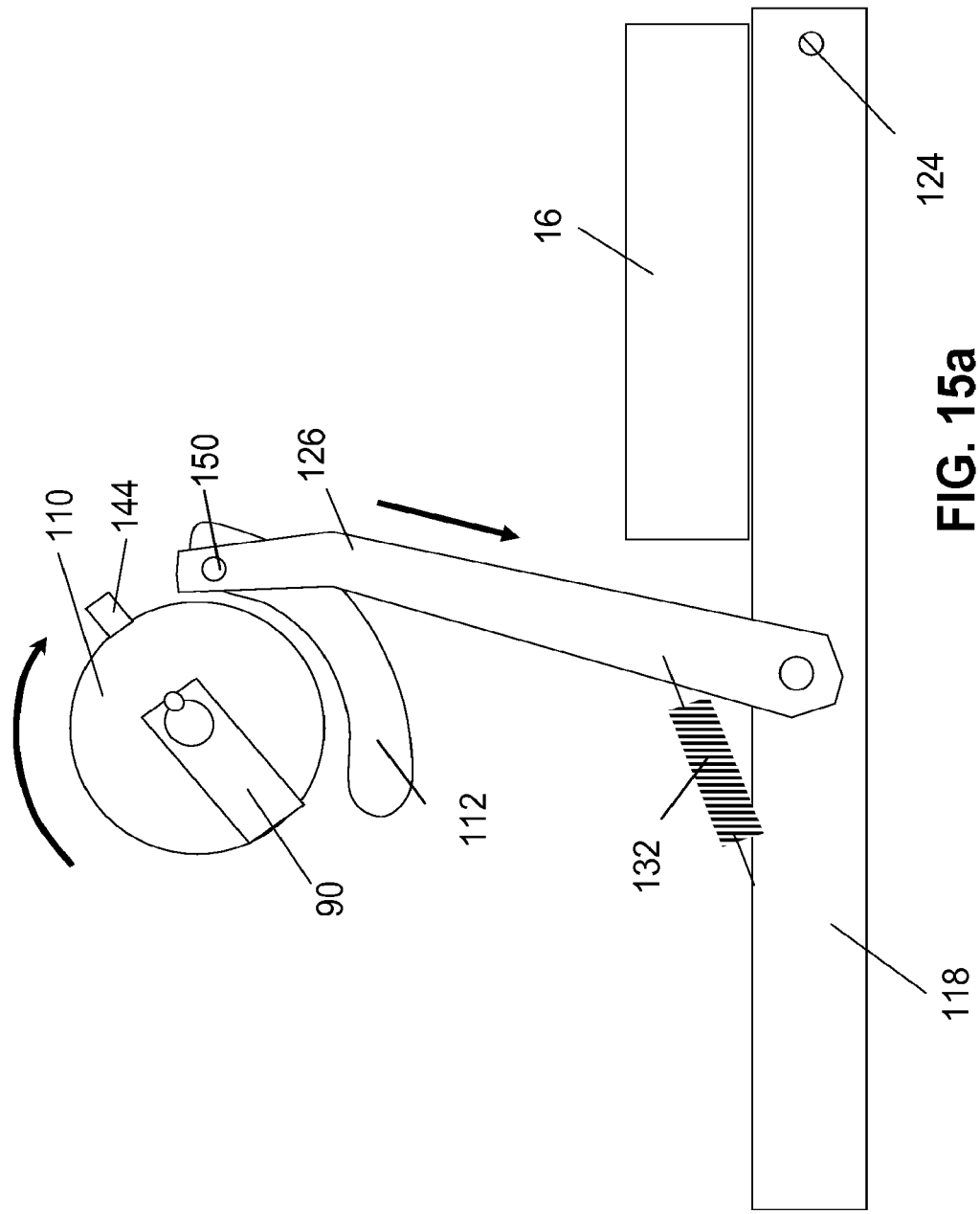
Figure 15C:
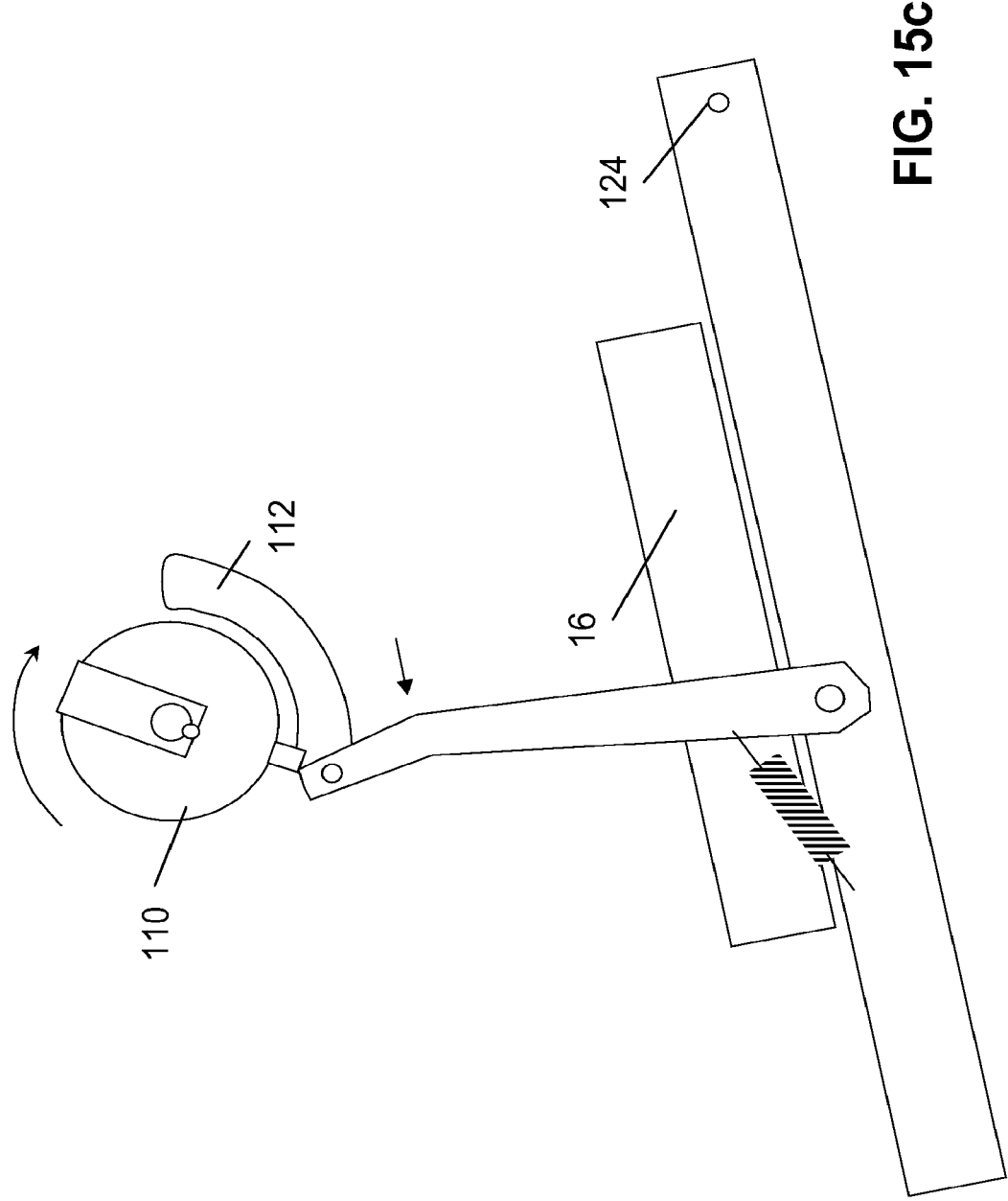
Figure 15E:
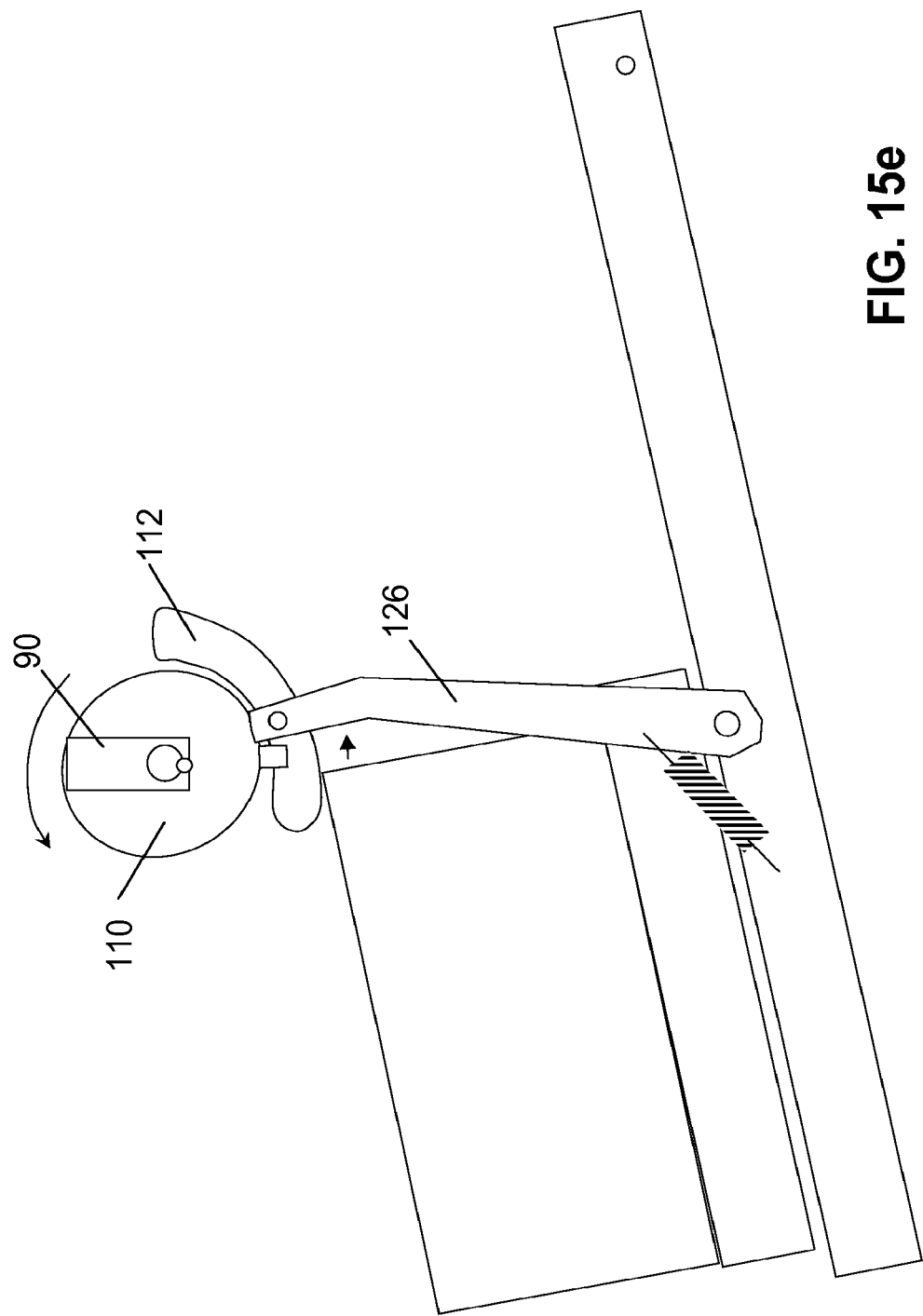

FIGS. 15a-15f illustrate one exemplary means for achieving the relative movement between the conveyor and the desealing components. FIG. 15a shows the starting position at which the plate 16 is placed on conveyor 118 at a location that is close to the conveyor pivot 124. Arm 126 is biased by spring 132 to a position such that conveyor 118 is level (not pivoted). FIGS. 15b-e illustrates the conveyor 118 in the pivoted position during various steps of the process to position the plate in preparation for desealing. In FIG. 15b, a tab 144 extending from key rotator 110, when rotated clockwise (in reverse), cams against a spring-loaded arm 126 which in turn applies a downward force against the conveyor mechanism 118, causing it to tilt around the conveyor pivot 124. The upper end of arm 126 is slidably connected via pin 150 to the roller guide 112. At approximately the 5 o'clock position, tab 144 contacts the upper right corner of arm 126, applying a downward force to conveyor 118 and causing the arm 126 to slide to the lowest extent of roller guide 112. FIG. 15c shows continued clockwise rotations of key rotator 110, positioning tab 144 at approximately 7 o'clock, which forces arm 126 to the left (as illustrated), and brings the key rotator 110 and roller guide into alignment. Once the plate 16 reaches the desealing position, the direction of rotation of key rotator 110 reverts to counterclockwise, rotating within the roller guide 112, so that tab 144 catches the forward edge of arm 126, as shown in FIG. 15d. Continued counterclockwise rotation causes the arm to slide within the roller guide, so that the arm is forced backward (to the right as illustrated) and the upper end of the arm 126 moves toward the highest extent of the roller guide 112, as illustrated in FIG. 15e. In FIG. 15f, pin 150 has slid fully toward the highest extent on roller guide 112, which relaxes the pressure overcoming the bias of spring 132, allowing conveyor 118 to return to its normal horizontal. At this point of the rotation of the key rotator 110, the glue strip 92 on key 90 has been oriented to contact the leading edge of the seal. The plate 16 is translated by the conveyor 118 from left to right, as illustrated, while the key is rotated to peel the seal away from the plate, as previously described.

In one embodiment, the system is adapted to accommodate thin and thick plates, the thinnest being 10 mm and deep well plates being about 45 mm. In order to provide this capability, a relative height adjustment means is included to vary the spacing between the key mechanism and the conveyor mechanism. It may be practical to keep a spacer block in place for the thinner plates and remove it for the tall ones. Preferably, the entire range could be covered with only a single spacer block.

The motion sequence may be controlled by a PIC microcontroller, although a simple relay-controlled sequence may also be appropriate. The system should preferably operate by simply loading a plate and pressing "start". A display is not required; however two or three indicator lamps would be useful to indicate normal operation.

The foregoing description has been addressed to the removable of a peelable seal from a typical multi-well plate which is used for compound synthesis and storage in chemical and biological applications. This is provided as an illustrative example only since the present invention is equally useful for removal of peelable seals from virtually any type of container that is has a construction that can tolerate the conditions required to apply an adhesive to the upper surface of the seal with a sufficient strength to separate the seal from the container when the adhesive is pulled upward. For example, the invention may be used for removal of seals from other arrays of containers, clinical tests kits, or even individual vials that are retained within a tray or support rack. The invention can be used for opening food containers or other packaging as well. Generally, the inventive method and device can be used open nearly all packages or containers that have a seal that can be removed by a peeling action, with the possible exception of containers that are crushable or too flexible to allow application of the adhesive without damaging the container.

The invention may also be useful in removing dried paints or films from surfaces where more abrasive techniques could damage the surface below.

It will be apparent to those skilled in the art that various modifications and variations may be made in the system and devices of the present invention without departing from the spirit and scope of the invention. Thus, it is intended that the present invention encompass all such modifications and variations to the extent that they fall within the scope of the appended claims and their equivalents.

What is claimed is:

1. A device for removal of a film from an object, comprising:
   a processing surface;
   a collection rod disposed above the processing surface, the collection rod having a length substantially equal to or greater than a width of the object;
   an adhesive surface extending downward along the length of the collection rod;
   an alignment system disposed on the processing surface and configured so that the alignment system defines aligning of a leading edge of the object relative to the collection rod and the adhesive surface;
   a conveyor configured to move one of the object and the adhesive surface relative to the other along a translation path that is in a direction parallel to a plane of the processing surface, the translation path having a predetermined orientation with respect to a leading edge of the film; and
   an uplift mechanism for producing tangential upward forces at a downstream side of the collection rod, the uplift mechanism being configured with respect to the translation path and the leading edge of the film so that the adhesive surface pulls up the leading edge of the film in a skewed direction so that a component direction of the skewed direction, which component direction is oriented parallel to the plane of the processing surface, an as defined by the predetermined orientation between the translation path and the leading edge of the film, is skewed relative to the leading edge of the object at a substantially constant skewed angle and causes the film to be peeled upward away from the object as one of the object and the collection rod is moved from the leading edge of the film to a trailing edge of the film.

2. The device of claim 1, wherein the adhesive surface comprises a heat activated glue strip and the device further comprises a heat source for activating the glue strip.

3. The device of claim 1, wherein the collection rod is oriented at an angle to begin peeling the film at one corner of the film.

4. The device of claim 1, wherein the adhesive surface comprises an adhesive tape, and further comprising:
- a source roll comprising unused tape;
- a pressure surface;
- a take-up reel for collecting used tape and removed film, wherein a tape path extends from the source roll, under the pressure surface, under the collection rod and ends at the take-up reel; and
- a driver motor to rotate the take-up reel to pull the tape from the source roll and through the tape path.

5. The device of claim 4, wherein the tape path changes direction at the collection rod so that the tape path downstream of the collection rod is 90°±10° relative to the tape path upstream of the collection rod.

6. The device of claim 4, wherein the alignment system comprises a conveyor car.

7. The device of claim 4, further comprising a controller for controlling rotational speed of the take-up reel and coordinating a speed of the conveyor with the rotational speed of the take-up reel.

8. The device of claim 7, wherein the rotational speed of the take-up reel is adjusted as the used tape is accumulated on the take-up reel.

9. The device of claim 1, wherein the adhesive surface comprises an adhesive tape, and further comprising:
- a source roll comprising unused tape;
- a pressure surface;
- a take-up reel for collecting used tape and removed film, wherein a tape path extends from the source roll, under the pressure surface, under the collection rod and ends at the take-up reel;
- a set of pinch rollers including a drive roller for pulling the tape from the source roll and through the tape path.

10. The device of claim 9, further comprising a paper roll for dispensing a roll of paper backing tape, wherein the paper backing take is fed into the pinch roller with the adhesive tape.

11. The device of claim 9, wherein the tape path changes direction at the collection rod so that the tape path downstream of the collection rod is 90°±10° relative to the tape path upstream of the collection rod.

12. The device of claim 1, further comprises a sensor disposed over the processing surface downstream from the collection rod for detecting a residual film on the object and generating a signal in response to detection of the residual film.

13. The device of claim 1, wherein the collection rod comprises a key having a strip of adhesive extending along a length of the key, and wherein the uplift mechanism for generating upward tangential forces comprises a key roller that receives the key, rotates the key to contact the adhesive strip to a leading edge of the film and rotates the key to roll the film around the length of the key as the conveyor transports the container or container array.

14. The device of claim 13, wherein the adhesive strip comprises a heat activated glue, and further comprising a heat source for activating the glue.

15. The device of claim 1, wherein the uplift mechanism for generating upward tangential forces comprises a surface of the collection rod.

16. An apparatus for removal of a film from a top surface of an object, configured to hold laboratory samples, the object having a top surface, opposing sides separated by a width and a leading edge extending between the sides, the apparatus comprising:
- a processing surface;
- a continuous adhesive tape having an adhesive side along a tape path from a source roll to an uptake roll above the processing surface so that the adhesive side is directed downward to contact the film on the object disposed on the processing surface, the adhesive tape having a width corresponding to a width of the object;
- a collection surface disposed above the processing surface such that the collection rod is positioned to cross the leading edge at a skewed crossing angle relative to the leading edge of the object and between the opposing sides separated by the width of the object;
- a pressure surface oriented to apply a downward pressure against the adhesive tape and force the adhesive side into contact with the film;
- a conveyance connected to the processing surface and arranged so that the conveyance translates one of the object and the adhesive tape relative to the other along a translation path having a predetermined orientation with respect to the leading edge of the object so that the adhesive tape is adhered to at least a corner of the film, wherein the corner of the film is adhered to the top of the object and is proximate to the leading edge of the object between the leading edge and the laboratory samples;
- wherein the collection rod effects applying an upward pulling force on the tape, the collection rod being configured with respect to the translation path and the leading edge of the object so that the upward pulling force on the tape peels the film away from the object at a substantially constant angle corresponding to the skewed crossing angle in a skewed direction so that a component direction of the skewed direction, which component direction is parallel to a plane of the processing surface, and as defined by the predetermined orientation between the translation path and the leading edge of the object, is skewed relative to the leading edge of the object.

17. The apparatus of claim 16, further comprising a plurality of pinch rollers for maintaining a tension on the adhesive tape while applying the upward pulling force; and
- a take-up reel configured for rolling used adhesive tape and attached separated film.

18. The apparatus of claim 17, further comprising a roller configured for feeding a backing tape before the adhesive tape enters the pinch rollers, wherein the backing tape adheres to an adhesive surface of the adhesive tape and the separated film, and the step of rolling takes up the adhesive tape, separated film and backing tape.

19. The apparatus of claim 16, further comprising a sensor located over the processing surface downstream from the collection rod for detecting a residual film on the object and generating a signal in response to the detection of residual film.

20. The apparatus of claim 16, wherein the object comprises a plate or array of containers containing liquid samples.

* * * * *